United States Patent
Lei et al.

(10) Patent No.: US 10,630,513 B2
(45) Date of Patent: Apr. 21, 2020

(54) SIGNAL SPREADING TECHNIQUES FOR NON-ORTHOGONAL MULTIPLE ACCESS WIRELESS COMMUNICATIONS

(71) Applicant: QUALCOMM Incorporated, San Diego, CA (US)

(72) Inventors: Jing Lei, San Diego, CA (US); Seyong Park, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/245,765

(22) Filed: Jan. 11, 2019

(65) Prior Publication Data

US 2019/0229957 A1    Jul. 25, 2019

Related U.S. Application Data

(60) Provisional application No. 62/619,496, filed on Jan. 19, 2018.

(51) Int. Cl.
*H04L 23/02* (2006.01)
*H04L 25/03* (2006.01)
(Continued)

(52) U.S. Cl.
CPC ..... *H04L 25/03942* (2013.01); *H04B 7/0456* (2013.01); *H04J 13/0007* (2013.01);
(Continued)

(58) Field of Classification Search
CPC ... H04W 72/02; H04W 72/04; H04W 72/042; H04W 74/044; H04W 72/0413;
(Continued)

(56) References Cited

U.S. PATENT DOCUMENTS

2017/0230138 A1* 8/2017 Xiong ................... H04L 1/0003
2019/0044588 A1* 2/2019 Hong ................... H04B 7/0456
(Continued)

FOREIGN PATENT DOCUMENTS

| EP | 3331308 A1 | 6/2018 |
| WO | WO-2016177155 A1 | 11/2016 |
| WO | WO-2017201704 A1 | 11/2017 |

OTHER PUBLICATIONS

International Search Report and Written Opinion—PCT/US2019/013446—ISA/EPO—dated May 13, 2019.
(Continued)

*Primary Examiner* — Khai Tran
(74) *Attorney, Agent, or Firm* — Holland & Hart LLP/QUALCOMM Incorporated

(57) ABSTRACT

Methods, systems, and devices for wireless communications are described in which different spreading sequences may be used to distinguish concurrent non-orthogonal multiple access (NOMA) transmissions. The spreading sequences may be selected based on one or more codebooks configured at a user equipment (UE) and a codebook for an uplink NOMA transmission determined based on a set of common resources allocated for the uplink NOMA transmission and a number of expected transmitters in a transmitter group. The UE may identify data to transmit in the uplink NOMA transmission, apply the spreading sequence to the data, and transmit the spread data in the uplink NOMA transmission. A base station may receive multiple concurrent uplink NOMA transmissions, perform receive signal processing to identify spreading signals and UE identity, de-spread the signals based on different spreading sequences, and demodulate and decode the de-spread signals of the NOMA UE.

30 Claims, 20 Drawing Sheets

(51) Int. Cl.
*H04J 13/16* (2011.01)
*H04J 13/00* (2011.01)
*H04B 7/0456* (2017.01)
*H04J 11/00* (2006.01)

(52) U.S. Cl.
CPC ........ *H04J 13/16* (2013.01); *H04L 25/03904* (2013.01); *H04J 11/004* (2013.01)

(58) Field of Classification Search
CPC ... H04L 5/048; H04L 25/0398; H04L 1/0054; H04L 1/005; H03B 7/0456
USPC .......................................................... 375/262
See application file for complete search history.

(56) References Cited

U.S. PATENT DOCUMENTS

2019/0174345 A1* 6/2019 Xing ..................... H04W 72/12
2019/0245640 A1* 8/2019 Yoshimoto ........... H04J 11/0086

OTHER PUBLICATIONS

Qing W., et al., "Non-Orthogonal Coded Access for Contention-Based Transmission in 5G", 2017 IEEE 86th Vehicular Technology Conference (VTC-FALL), IEEE, Sep. 24, 2017 (Sep. 24, 2017), pp. 1-6, XP033319681, DOI: 10.1109/VTCFALL.2017.8288079 [retrieved on Feb. 8, 2018] Non-Orthogonal Coded Access NOCA; p. 2, Paragraph B, Transmitter Structure of NOCA.

Sergey D., et al., "Non-Orthogonal Multiple Access with Low Code Rate Spreading and Short Sequence Based Spreading", 2017 IEEE 86th Vehicular Technology Conference (VTC-FALL), IEEE, Sep. 24, 2017 (Sep. 24, 2017), pp. 1-5, XP033320009, DOI: 10.1109/VTCFALL.2017.8288408 [retrieved on Feb. 8, 2018] Short Sequence based Spreading Multiple Access SSMA.; p. 2, Paragraph II. Transmission Schemes.

* cited by examiner

SIGNAL SPREADING TECHNIQUES FOR NON-ORTHOGONAL MULTIPLE ACCESS WIRELESS COMMUNICATIONS

CROSS REFERENCES

The present application for patent claims the benefit of U.S. Provisional Patent Application No. 62/619,496 by LEI et al., entitled "SIGNAL SPREADING TECHNIQUES FOR NON-ORTHOGONAL MULTIPLE ACCESS WIRELESS COMMUNICATIONS," filed Jan. 19, 2018, assigned to the assignee hereof, and expressly incorporated herein.

BACKGROUND

The following relates generally to wireless communication, and more specifically to signal spreading techniques for non-orthogonal multiple access wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support signal spreading techniques for non-orthogonal multiple access (NOMA) wireless communications. Generally, the described techniques provide for different spreading sequences that may be used to distinguish transmitters that transmit concurrently over common transmission resources using NOMA techniques. In some cases, the spreading sequences may be selected based on one or more codebooks configured at a user equipment (UE). A codebook for an uplink NOMA transmission may be determined based on a set of common resources allocated for the uplink NOMA transmission and a number of expected transmitters in a transmitter group configured to use the set of common resources. The UE may identify data to transmit in the uplink NOMA transmission, apply the spreading sequence to the data, and transmit the spread data in the uplink NOMA transmission to a base station. The base station may receive multiple concurrent uplink NOMA transmissions from multiple UEs, perform received signal processing to identify spread signals from each of the multiple UEs, de-spread the signals based on different spreading sequences used to identify particular UEs that transmitted the de-spread signals, and demodulate and decode the de-spread signals.

In some cases, the spreading sequence applied by the NOMA transmitter may be determined using a closed form expression. Each of a set of available spreading sequences may be determined based on a number and a configuration of resources in the set of common resources and the expected number of transmitters in the group of NOMA transmitters. In such cases, a base station may provide a UE with the set of common resources and number of expected transmitters in the group of NOMA transmitters. The UE may identify the set of available spreading sequences and select the spreading sequence from the identified set of available spreading sequences. In some cases, the spreading sequence is a polyphase sequence that is a function of a number and configuration of resources of the set of common resources and a particular UE of the group of NOMA transmitters.

A method of wireless communication is described. The method may include receiving, from a base station, an indication of a set of common resources for an uplink transmission and a number of transmitters in a group of non-orthogonal multiple access (NOMA) transmitters configured for concurrent transmissions using the set of common resources, determining, based on the set of common resources and the number of transmitters, a spreading sequence for the uplink transmission, identifying data to be transmitted in the uplink transmission, applying the spreading sequence to the data to be transmitted in the uplink transmission, and transmitting the uplink transmission to the base station.

An apparatus for wireless communication is described. The apparatus may include means for receiving, from a base station, an indication of a set of common resources for an uplink transmission and a number of transmitters in a group of non-orthogonal multiple access (NOMA) transmitters configured for concurrent transmissions using the set of common resources, means for determining, based on the set of common resources and the number of transmitters, a spreading sequence for the uplink transmission, means for identifying data to be transmitted in the uplink transmission, means for applying the spreading sequence to the data to be transmitted in the uplink transmission, and means for transmitting the uplink transmission to the base station.

Another apparatus for wireless communication is described. The apparatus may include a processor, memory in electronic communication with the processor, and instructions stored in the memory. The instructions may be operable to cause the processor to receive, from a base station, an indication of a set of common resources for an uplink transmission and a number of transmitters in a group of non-orthogonal multiple access (NOMA) transmitters configured for concurrent transmissions using the set of common resources, determine, based on the set of common resources and the number of transmitters, a spreading sequence for the uplink transmission, identify data to be transmitted in the uplink transmission, apply the spreading sequence to the data to be transmitted in the uplink transmission, and transmit the uplink transmission to the base station.

A non-transitory computer-readable medium for wireless communication is described. The non-transitory computer-readable medium may include instructions operable to cause a processor to receive, from a base station, an indication of a set of common resources for an uplink transmission and a number of transmitters in a group of non-orthogonal multiple access (NOMA) transmitters configured for concurrent transmissions using the set of common resources, determine, based on the set of common resources and the number of transmitters, a spreading sequence for the uplink transmission, identify data to be transmitted in the uplink transmission, apply the spreading sequence to the data to be transmitted in the uplink transmission, and transmit the uplink transmission to the base station.

In some examples of the method, apparatus, and non-transitory computer-readable medium described herein, the spreading sequence may be determined using a closed form expression in which each of a number of available spreading sequences can be determined based on a number and a configuration of resources in the set of common resources and an expected number of transmitters in the group of NOMA transmitters. In some cases, the closed form expression may be a modified transmission/reception point (TRP) sequence.

Some examples of the method, apparatus, and non-transitory computer-readable medium described herein may further include processes, features, means, or instructions for identifying a number of codebooks that each include a number of spreading sequences, each of the number of codebooks indexed according to numbers of resources and numbers of transmitters. Some examples of the method, apparatus, and non-transitory computer-readable medium described herein may further include processes, features, means, or instructions for selecting a first codebook of the number of codebooks based on a first index value associated with a number and a configuration of resources in the set of common resources and a second index value associated with the number of transmitters in the group of NOMA transmitters.

In some examples of the method, apparatus, and non-transitory computer-readable medium described herein, the spreading sequence may be a polyphase sequence that may be a function of a number and a configuration of resources of the set of common resources and a selected transmitter of the number of transmitters in the group of NOMA transmitters. In some examples of the method, apparatus, and non-transitory computer-readable medium described herein, the selected transmitter may be randomly selected or received from the base station. In some examples of the method, apparatus, and non-transitory computer-readable medium described herein, the set of common resources includes frequency resources, time resources, spatial resources, or any combination thereof.

Some examples of the method, apparatus, and non-transitory computer-readable medium described herein may further include processes, features, means, or instructions for channel coding the data to be transmitted to generate channel coded data. Some examples of the method, apparatus, and non-transitory computer-readable medium described herein may further include processes, features, means, or instructions for modulating the channel coded data to generate a series of modulation symbols. In some examples of the method, apparatus, and non-transitory computer-readable medium described herein, the spreading sequence may be applied to each modulation symbol of the series of modulation symbols.

Some examples of the method, apparatus, and non-transitory computer-readable medium described herein may further include processes, features, means, or instructions for mapping the spread series of modulation symbols to resources of the set of common resources, where the resources include frequency resources, time resources, spatial resources, or any combination thereof. In some examples of the method, apparatus, and non-transitory computer-readable medium described herein, the set of common resources and the number of transmitters in the group of NOMA transmitters may be received from the base station in a master information block (MIB), in a system information block (SIB), in remaining minimum system information (RMSI), or any combination thereof.

A method of wireless communication is described. The method may include identifying a group of transmitters configured for concurrent non-orthogonal multiple access (NOMA) transmissions, allocating a set of uplink resources for concurrent NOMA transmissions, transmitting, to the group of transmitters, an indication of the set of uplink resources and a number of transmitters in the group of transmitters, determining, based on the set of common resources and the number of transmitters, a spreading sequence codebook for uplink transmissions using the set of uplink resources, the spreading sequence codebook including a number of spreading sequences for uplink transmissions using the set of common resources, receiving at least two concurrent NOMA transmissions from at least two transmitters of the group of transmitters on same resources within the set of uplink resources, and identifying which transmitter of the group of transmitters transmitted each of the at least two concurrent NOMA transmissions, based on spreading sequences from the spreading sequence codebook that are applied to each of the concurrent NOMA transmissions.

An apparatus for wireless communication is described. The apparatus may include means for identifying a group of transmitters configured for concurrent non-orthogonal multiple access (NOMA) transmissions, means for allocating a set of uplink resources for concurrent NOMA transmissions, means for transmitting, to the group of transmitters, an indication of the set of uplink resources and a number of transmitters in the group of transmitters, means for determining, based on the set of common resources and the number of transmitters, a spreading sequence codebook for uplink transmissions using the set of uplink resources, the spreading sequence codebook including a number of spreading sequences for uplink transmissions using the set of common resources, means for receiving at least two concurrent NOMA transmissions from at least two transmitters of the group of transmitters on same resources within the set of uplink resources, and means for identifying which transmitter of the group of transmitters transmitted each of the at least two concurrent NOMA transmissions, based on spreading sequences from the spreading sequence codebook that are applied to each of the concurrent NOMA transmissions.

Another apparatus for wireless communication is described. The apparatus may include a processor, memory in electronic communication with the processor, and instructions stored in the memory. The instructions may be operable to cause the processor to identify a group of transmitters configured for concurrent non-orthogonal multiple access (NOMA) transmissions, allocate a set of uplink resources for concurrent NOMA transmissions, transmit, to the group of transmitters, an indication of the set of uplink resources and a number of transmitters in the group of transmitters, determine, based on the set of common resources and the number of transmitters, a spreading sequence codebook for uplink transmissions using the set of uplink resources, the spreading sequence codebook including a number of spreading sequences for uplink transmissions using the set of common resources, receive at least two concurrent NOMA transmissions from at least two transmitters of the group of transmitters on same resources within the set of uplink resources, and identify which transmitter of the group of transmitters transmitted each of the at least two concurrent NOMA transmissions, based on spreading sequences from the spreading sequence codebook that are applied to each of the concurrent NOMA transmissions.

A non-transitory computer-readable medium for wireless communication is described. The non-transitory computer-readable medium may include instructions operable to cause a processor to identify a group of transmitters configured for concurrent non-orthogonal multiple access (NOMA) transmissions, allocate a set of uplink resources for concurrent NOMA transmissions, transmit, to the group of transmitters, an indication of the set of uplink resources and a number of transmitters in the group of transmitters, determine, based on the set of common resources and the number of transmitters, a spreading sequence codebook for uplink transmissions using the set of uplink resources, the spreading sequence codebook including a number of spreading sequences for uplink transmissions using the set of common resources, receive at least two concurrent NOMA transmissions from at least two transmitters of the group of transmitters on same resources within the set of uplink resources, and identify which transmitter of the group of transmitters transmitted each of the at least two concurrent NOMA transmissions, based on spreading sequences from the spreading sequence codebook that are applied to each of the concurrent NOMA transmissions.

In some examples of the method, apparatus, and non-transitory computer-readable medium described herein, the number of spreading sequences may be determined using a closed form expression in which each of the number of spreading sequences can be determined based on a number of resources in the set of common resources and the number of transmitters in the group of transmitters.

Some examples of the method, apparatus, and non-transitory computer-readable medium described herein may further include processes, features, means, or instructions for identifying a number of codebooks that each include a number of spreading sequences, each of the number of codebooks indexed according to numbers of resources, configuration of resources, and numbers of transmitters. Some examples of the method, apparatus, and non-transitory computer-readable medium described herein may further include processes, features, means, or instructions for selecting a first codebook of the number of codebooks based on a first index value associated with a number of resources in the set of common resources and a second index value associated with the number of transmitters in the group of transmitters.

In some examples of the method, apparatus, and non-transitory computer-readable medium described herein, the spreading sequences may be polyphase sequences that may be a function of a number of resources and a selected transmitter identity for transmitters of the group of transmitters. In some examples of the method, apparatus, and non-transitory computer-readable medium described herein, the set of common resources includes frequency resources, time resources, spatial resources, or any combination thereof.

Some examples of the method, apparatus, and non-transitory computer-readable medium described herein may further include processes, features, means, or instructions for de-mapping received transmissions from the set of common resources to generate a de-spread set of modulation symbols. Some examples of the method, apparatus, and non-transitory computer-readable medium described herein may further include processes, features, means, or instructions for combining the de-spread set spread set of modulation symbols based on the number of spreading sequences in the spreading sequence codebook.

Some examples of the method, apparatus, and non-transitory computer-readable medium described herein may further include processes, features, means, or instructions for demodulating and decoding the set of modulation symbols.

Some examples of the method, apparatus, and non-transitory computer-readable medium described herein may further include processes, features, means, or instructions for determining a spreading sequence applied to each spread set of modulation symbols. Some examples of the method, apparatus, and non-transitory computer-readable medium described herein may further include processes, features, means, or instructions for identifying which transmitter of the group of transmitters transmitted each received transmission based on the determined spreading sequence.

In some examples of the method, apparatus, and non-transitory computer-readable medium described herein, the set of common resources include a set of shared resources, and where the set of shared resources, a configuration and size of the spreading sequence codebook, and a spreading scheme may be transmitted in a master information block (MIB), in a system information block (SIB), in remaining minimum system information (RMSI), in a payload of a group common physical downlink control channel (PDCCH) transmission, or any combination thereof.

DETAILED DESCRIPTION

Figure 1:
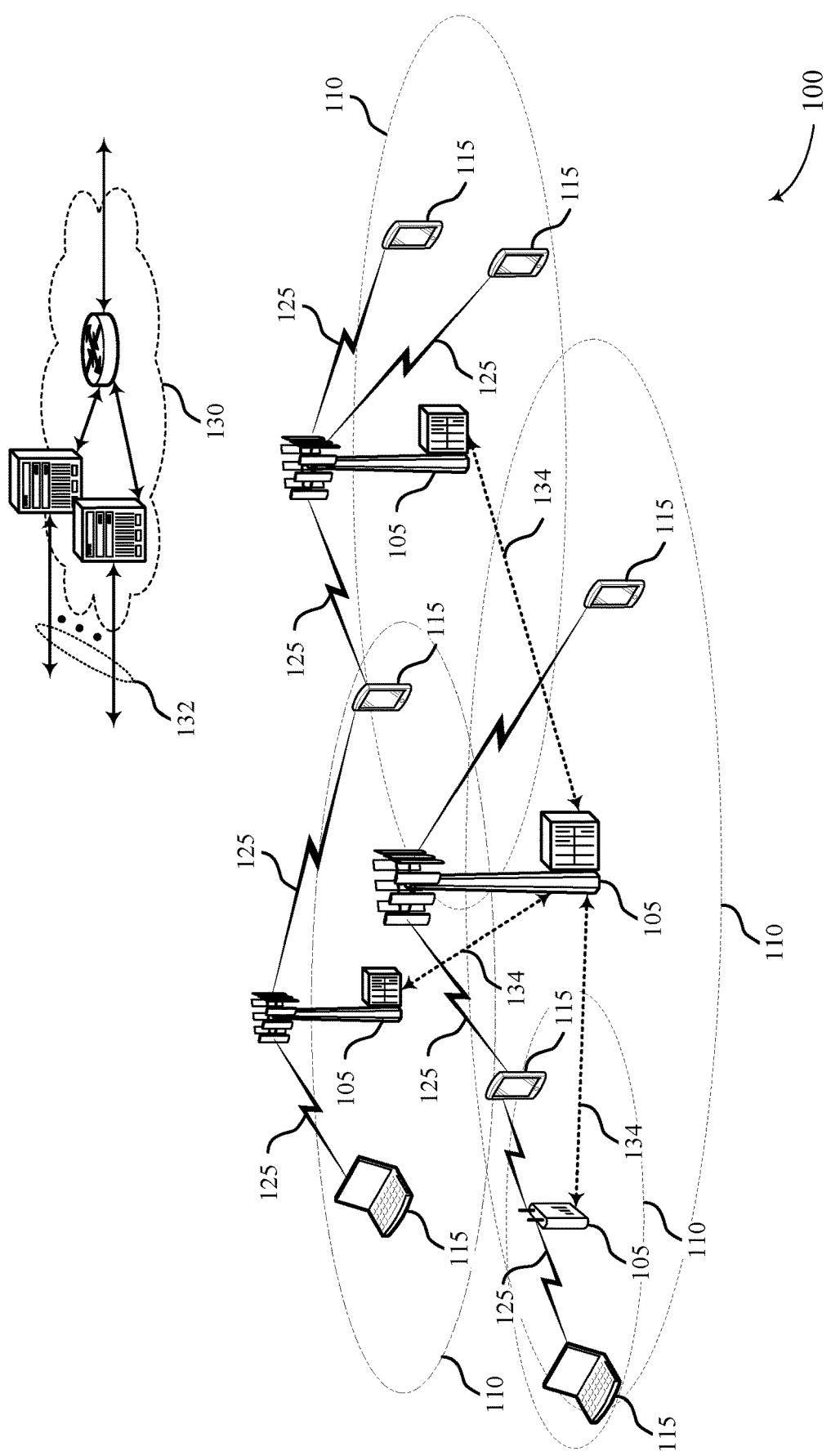
FIG. 1 illustrates an example of a system for wireless communication that supports signal spreading techniques for non-orthogonal multiple access wireless communications in accordance with aspects of the present disclosure.

Some wireless communications systems may support multiple access techniques for multiple users by sharing available system resources (e.g., time, frequency, and power). In some cases, non-orthogonal multiple access (NOMA) techniques may outperform orthogonal multiple access (OMA) techniques, and may allow multiple different transmitters to transmit concurrently. NOMA techniques may enable access to more system bandwidth for transmitting devices (e.g., a user equipment (UE)), while simultaneously enabling a greater number of users to communicate on a set of time frequency resources. As an example, using OMA techniques, a resource block (RB) may be allocated for three UEs such that, if each UE transmits using a single transmission antenna, three receive antennas may be used at a receiver (e.g., a base station), which may be representative of a 1×3 single-input, multiple-output (SIMO) transmission. By contrast, NOMA techniques may enable multiple UEs to concurrently transmit using the same resources in an RB.

NOMA techniques that enable the recovery of multiple simultaneous transmissions include, for example, successive interference cancelation (SIC), multi-user decoders (MUDs), resource spread multiple access (RSMA), or a combination thereof. A MUD may use SIC techniques to decode a first, relatively strong signal from a first transmitter. The MUD may subtract the first signal from the received signal, decode a second signal from a second transmitter, and so on. RSMA techniques may utilize lower rate channel coding that spreads a transmitted signal across resources. Gains obtained from the channel coding may lead to robust transmissions, and may be well suited for sporadic transmissions of small non-orthogonal data bursts. For example, RSMA techniques may be beneficial in systems that support machine type communication (MTC), enhanced MTC (eMTC), narrowband Internet of Things (NB-IoT) communications, and the like. In such cases, signals from multiple transmitting devices may be recovered simultaneously, even in the presence of mutual interference.

As described herein, the use of NOMA techniques may provide greater scheduling flexibility for multiple access by a large number of UEs (e.g., for massive machine-type communications (mMTC) systems), while also supporting robust communications with varying channel code rates. Various of the NOMA techniques may use spreading sequences to spread transmissions and identify a NOMA transmitter for a particular transmission. In some examples, the spreading sequences may be selected based on one or more codebooks configured at a UE. A codebook for an uplink NOMA transmission may be determined based on a set of common resources allocated for the uplink NOMA transmission and a number of expected UEs (e.g., an overloading factor) in a transmitter group configured to use the set of common resources. The UE may identify data to transmit in the uplink NOMA transmission, apply the spreading sequence to the data, and transmit the spread data in the uplink NOMA transmission to a base station. The base station may receive multiple concurrent uplink NOMA transmissions from multiple UEs, perform receive signal processing (e.g., SIC, RMSA, etc.) to identify spread signals from each of the multiple UEs, de-spread the signals based on different spreading sequences to identify particular UEs that transmitted the de-spread signals, and demodulate and decode the de-spread signals.

In some cases, the spreading sequence applied by the NOMA transmitter may be determined using a closed form expression in which each of a set of available spreading sequences may be determined based on a number and configuration of resources in the set of common resources, and the expected number of transmitters in the group of NOMA transmitters. In some cases, the closed form expression may be a modified transmission/reception point (TRP) sequence. In such cases, a base station may provide a UE with the set of common resources and number of expected transmitters in the group of NOMA transmitters, where the UE may identify the set of available spreading sequences and select the spreading sequence from the identified set of available spreading sequences. In some cases, the spreading sequence is a polyphase sequence that is a function of a number and a configuration of resources of the set of common resources and a particular UE of the group of NOMA transmitters. In some cases, the spreading and resource mapping for spreading sequences may be performed in single or multiple domains, including the frequency domain, the time domain, the spatial domain (e.g., via different transmission beams), or any combination thereof.

Various spreading sequences generated in accordance with techniques such as those discussed herein may thus provide pseudo-random sequences having a relatively low peak-to-average-power ratio (PAPR) and unit magnitude, that can be used as the signature waveform of UEs. Such sequences may enhance the spectrum efficiency and the capacity of massive connectivity systems (e.g., mMTC systems) by advantageously allowing relatively large overloading factors for a constrained resource size. Sequences provided herein also simplify the implementation of receivers by providing a closed form expression in which each set of available spreading sequences may be determined based on two factors, namely a number and configuration of resources in the set of common resources and the expected number of transmitters in the group of NOMA transmitters. Provided sequences also maintain relatively small cross correlations between different signatures. Furthermore, various design options for codebooks of short signature sequences provided herein can achieve Welch bound equality (WBE) for quasi-synchronous communications. In some examples, the closed form expression may be a modified TRP sequence.

Aspects of the disclosure are initially described in the context of a wireless communications system. Various examples of NOMA resources and spreading sequences are described that illustrate several signal spreading techniques in accordance with various aspects of the present the disclosure. Aspects of the disclosure are further illustrated by and described with reference to apparatus diagrams, system diagrams, and flowcharts that relate to signal spreading techniques for non-orthogonal multiple access wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may use NOMA techniques for transmissions, and transmit concurrent transmissions over common resources using signal spreading techniques in accordance with various examples as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier Transform spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Wireless communications system 100 may support the concurrent transmission of multiple transmitters through the use of various NOMA techniques. For example, a MUD at a base station 105 may use SIC to decode signals from multiple UEs 115 that are concurrently transmitted using common resources. Further, when transmitting a data stream, a UE 115 may apply different RSMA techniques to enhance reception at the base station 105. UEs 115 may spread signals in transmissions using a spreading sequence that may assist a base station 105 in receiving, decoding, and identifying signals of the UEs 115. In some cases, the spreading sequences may be selected based on one or more codebooks that are configured at UEs 115 that transmit NOMA transmissions, and a codebook for an uplink NOMA transmission may be determined based on a set of resources allocated for the uplink NOMA transmission and a number of expected UEs 115 in a transmitter group that is configured to use the set of resources. The UE 115 may identify data to transmit in the uplink NOMA transmission, apply the spreading sequence to the data, and transmit the spread data in the uplink NOMA transmission to a base station 105. The base station 105 may receive multiple concurrent uplink NOMA transmissions from multiple UEs 115, and may perform receive signal processing to identify spread signals from each of the multiple UEs 115. The base station 105 may de-spread the signals based on different spreading sequences to identify particular UEs 115 that transmitted the de-spread signals, and demodulate and decode the de-spread signals.

Figure 2:
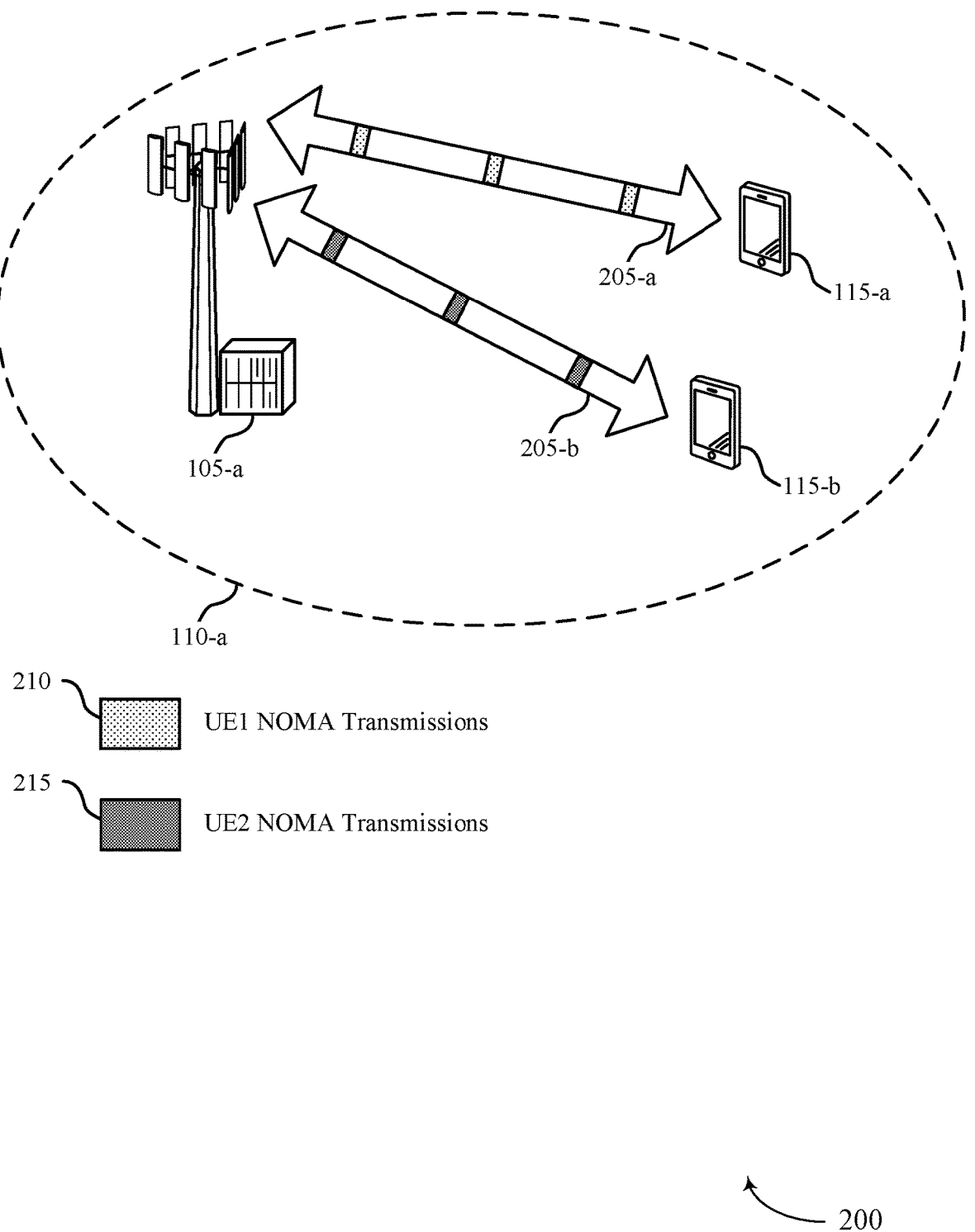
FIG. 2 illustrates an example of a portion of a wireless communication system that supports signal spreading techniques for non-orthogonal multiple access wireless communications in accordance with aspects of the present disclosure.

FIG. 2 illustrates an example of a portion of a wireless communication system 200 that supports signal spreading techniques for non-orthogonal multiple access wireless communications in accordance with various aspects of the present disclosure. In some examples, wireless communication system 200 may implement aspects of wireless communication system 100. In the example of FIG. 2, the wireless communication system 200 may include a base station 105-a, which may be an example of a base station 105 of FIG. 1. The wireless communication system 200 may also include a first UE 115-a and a second UE 115-b, which may be examples of a UE 115 of FIG. 1, that are located within coverage area 110-a of the base station 105-a.

In the example of FIG. 2, the base station 105-a and the first UE 115-a may establish a first connection 205-a and the base station 105-a and the second UE 115-b may establish a second connection 205-b. In some cases, each of the first UE 115-a and the second UE 115-b may concurrently transmit uplink transmissions via their respective connections 205 in accordance with NOMA techniques. As discussed herein, NOMA techniques may enhance the achievable spectral efficiency (SE) of the wireless communication system 200. In some cases, the base station 105-a may include a SIC/MUD receiver that may receive and decode signals concurrently transmitted from the first UE 115-a and the second UE 115-b. In various aspects of the present disclosure, the UEs 115 may apply spreading sequences to uplink transmissions based on a codebook of available spreading sequences, as will be discussed in more detail in FIGS. 3 through 6.

Figure 3:
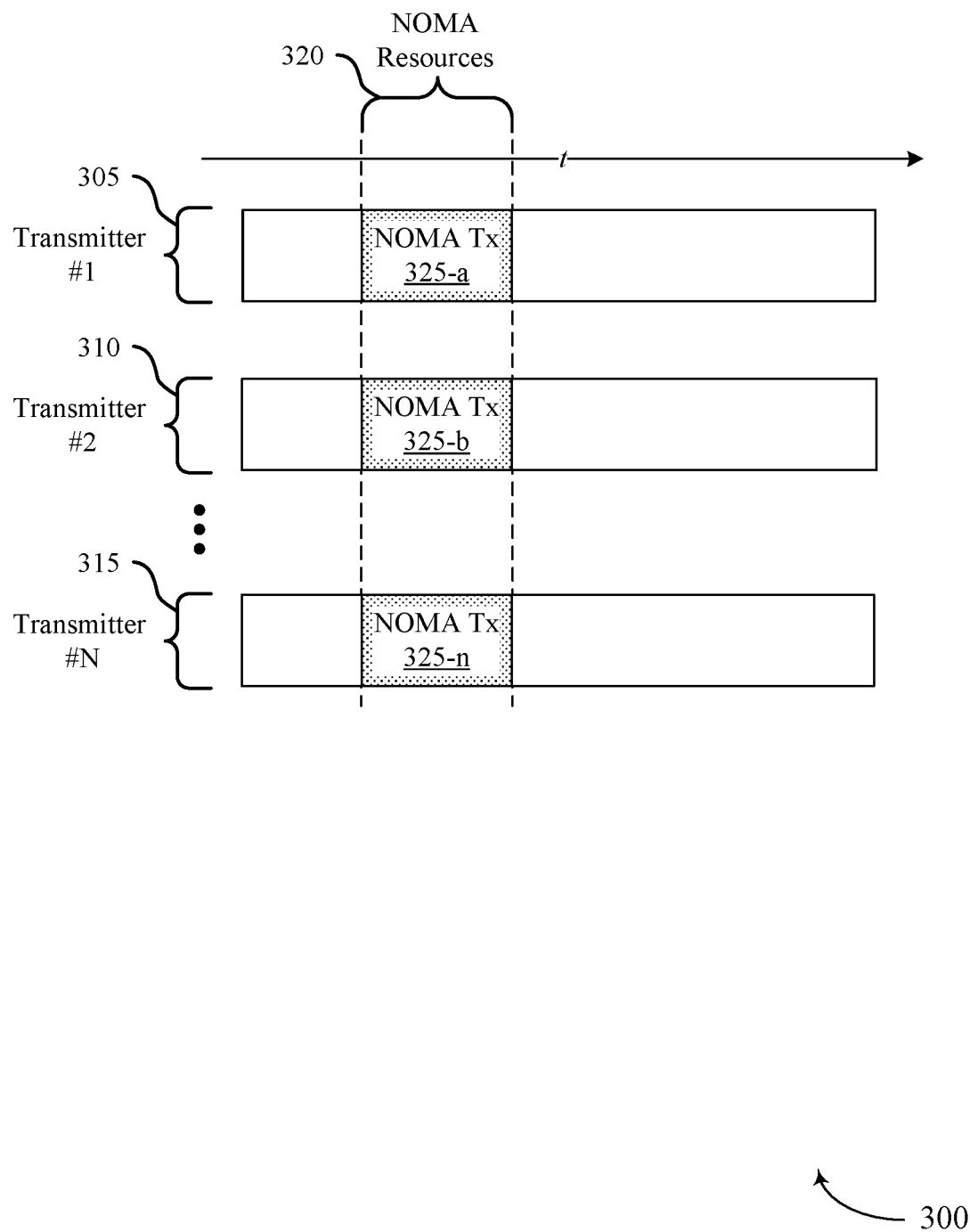
FIG. 3 illustrates an example of non-orthogonal multiple access resources that support signal spreading techniques for non-orthogonal multiple access wireless communications in accordance with aspects of the present disclosure.

FIG. 3 illustrates an example of non-orthogonal multiple access resources 300 that support signal spreading techniques for non-orthogonal multiple access wireless communications in accordance with various aspects of the present disclosure. In some examples, non-orthogonal multiple access resources 300 may be implemented in aspects of wireless communication system 100 or 200.

In the example of FIG. 3, a number of UEs may be partitioned into a number of transmitter groups that may be allocated common resources for concurrent NOMA transmissions. In this example, a first transmitter 305, a second transmitter 310, through an Nth transmitter 315 may be in a first transmitter group that is allocated NOMA resources 320. While allocated NOMA resources 320 are illustrated as common resources in the time domain, NOMA resources may be allocated in the time domain, frequency domain, spatial domain (e.g., via different beamformed transmission beams), or any combination thereof. As indicated herein, each transmitter 305-315 may transmit a NOMA transmission 325 using NOMA resources 320, and in this example the first transmitter 305 may transmit a first NOMA transmission 325-*a*, the second transmitter 310 may transmit a second NOMA transmission 325-*b* and so on, with the Nth transmitter 315 transmitting an Nth NOMA transmission 325-*n*. Each of the NOMA transmissions 325 may have a spreading sequence applied thereto and according to various techniques provided herein. In some cases, the spreading sequence applied to each NOMA transmission 325 may be selected from a spreading sequence codebook, which may also be referred to as a signature sequence codebook. In some cases, each of the spreading sequences provided in a codebook may be determined based on a closed-form expression in which each set of available spreading sequences may be determined based on two factors, namely a number and configuration of resources in the NOMA resources 320, and the number of transmitters (N) that are expected to transmit using the common NOMA resources 320. Such a closed form expression may simplify the implementation of spreading sequences and may require relatively low memory.

In some cases, the spreading sequences may be derived from one of a number of expressions. For example, a codebook of spreading sequences may be defined as:

$$\Theta_{N \times K} \triangleq [S_1 S_2 \ldots S_N]^T$$

and within each codebook the $n^{th}$ spreading sequence may be defined as:

$$S_n \triangleq [S_n(1) S_n(2) \ldots S_n(K)]^T$$

in which N is the number of distinct sequences in the codebook of spreading sequences, and K is the length of the spreading sequences. In some cases, the number of distinct sequences in the codebook, K, may correspond to the number and configuration on the NOMA resources 320 (e.g., a number of OFDM symbols, a number of resource blocks (RBs), etc.), and the number of distinct sequences in the codebook, K, may correspond to the expected number of transmitters 305-315. The distinct sequences within a codebook may be defined using a number of different options for closed form expressions. In some cases, each sequence may be defined by the expression:

$$s_n(k) \triangleq \frac{1}{\sqrt{K}} \exp\left(\frac{j\pi(k+n+\theta)(k+n+1+\theta)}{N}\right);$$

$$1 \le k \le K, 1 \le n \le N, -N \le \theta < N$$

in which θ is a random integer, and k and n are indexes into the codebook. In other cases, each sequence may be defined by the expression:

$$s_n(k) \triangleq \frac{1}{\sqrt{K}} \exp\left(\frac{j\pi(k+n+\theta)^2}{N}\right);$$

$$1 \le k \le K, 1 \le n \le N, -N \le \theta < N.$$

In other cases, a more scalable expression may be used:

$$s_n(k) \triangleq$$

$$\begin{cases} \frac{1}{\sqrt{K}} \exp\left(\frac{j2\pi(k+n+\theta)(k+n+1+\theta)}{N}\right); 1 \le k \le K, 1 \le n \le \frac{N}{2}, -N \le \theta < N \\ \frac{1}{\sqrt{K}} \exp\left(\frac{j2\pi(k+n+\theta)^2}{N}\right); 1 \le k \le K, N/2 < n \le N, -N \le \theta < N \end{cases}$$

which may allow for a greater number of sequences in the codebook. As indicated above, a transmitter may apply a particular spreading sequence to a transmission as part of a NOMA transmission, which may provide a signature sequence for each transmitter. One example of application of a spreading sequence to a NOMA transmission is illustrated in FIG. 4, and a corresponding example of receiving NOMA transmissions is illustrated in FIG. 5.

Figure 4:
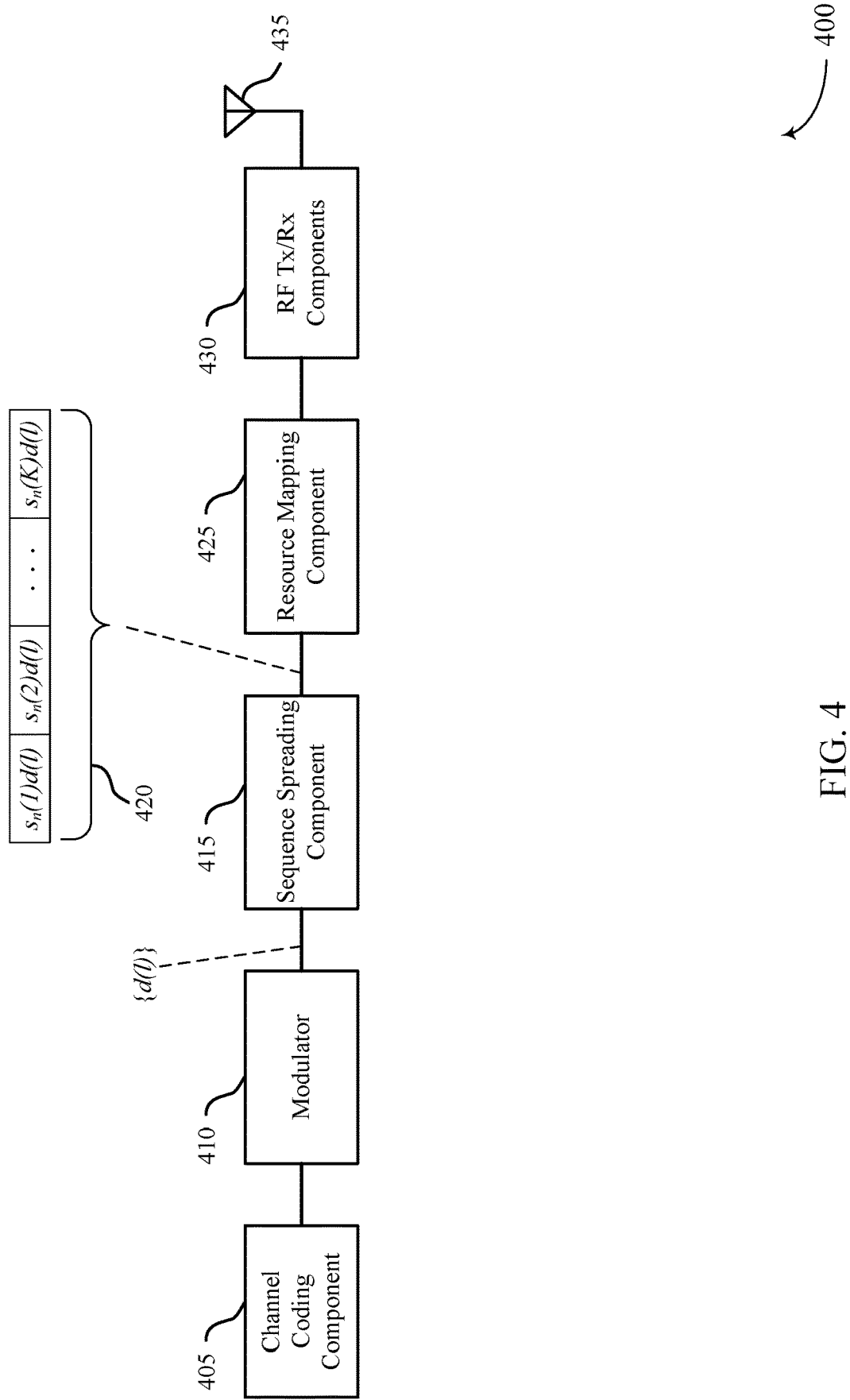
FIG. 4 illustrates an example of a transmit chain that supports signal spreading techniques for non-orthogonal multiple access wireless communications in accordance with aspects of the present disclosure.

FIG. 4 illustrates an example of a transmit chain 400 that supports signal spreading techniques for non-orthogonal multiple access wireless communications in accordance with various aspects of the present disclosure. In some examples, transmit chain 400 may implement aspects of wireless communication system 100 or 200. The transmit chain 400 may be implemented at a UE (e.g., a UE 115 of FIG. 1 or 2), although the concepts provided herein may be applied to any NOMA transmitter.

In this example, data to be transmitted may be provided to a channel coding component 405, which may perform channel coding of the data into one or more transmit channels in accordance with a particular system in which the transmitter operates (e.g., an NR uplink data and/or control channel). The channel coded data may be provided to a modulator 410 that may modulate the coded data according to a modulation and coding scheme (MCS) to provide a sequence of modulation symbols {d(l)}. This sequence of modulation symbols may be provided to sequence spreading component 415 which may apply a spreading sequence to the modulation symbols in accordance with various techniques provided herein, and may provide a spread sequence of modulation symbols {$s_n$(1)d(l), $s_n$(2)d(l), ... $s_n$(K)d(l)}, where K is selected based on the number and configuration of transmission resources (e.g., a number of OFDM symbols or RBs, etc.). The particular spreading sequence applied by the transmitter, identified as an index n into the codebook, may in some examples be randomly selected by a UE or assigned by a base station. A resource mapping component 425 may map the spread sequence to allocated resources for transmission by radio frequency (RF) transmission/receive components 430 and antenna 435 (which may include one or more antenna elements). The resources used for transmission may include one or multiple domains, including but not limited to time, frequency, and spatial domains or any combination thereof.

Figure 5:
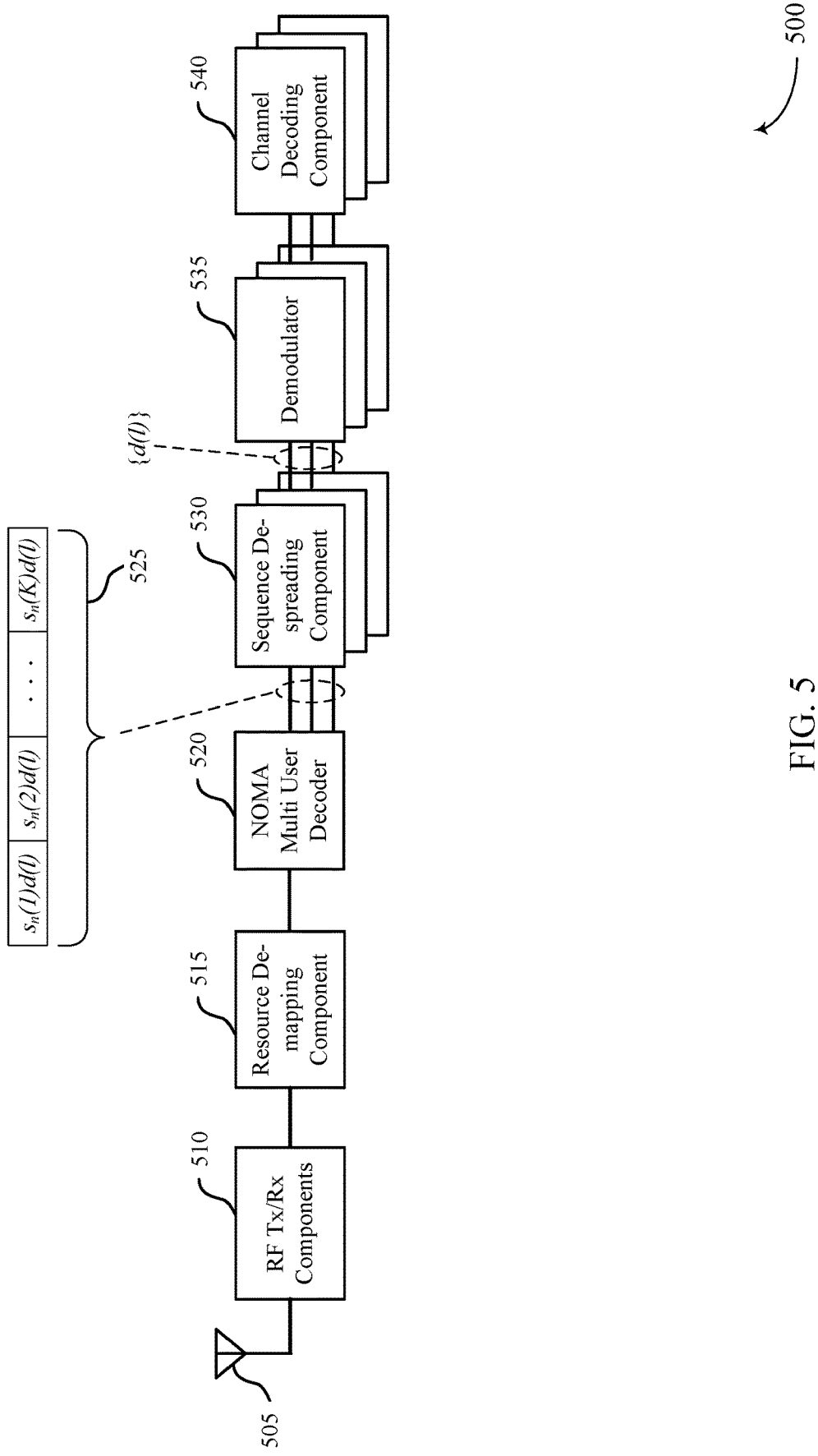
FIG. 5 illustrates an example of a receive chain that supports signal spreading techniques for non-orthogonal multiple access wireless communications in accordance with aspects of the present disclosure.

FIG. 5 illustrates an example of a receive chain 500 that supports signal spreading techniques for non-orthogonal multiple access wireless communications in accordance with various aspects of the present disclosure. In some examples, receive chain 500 may implement aspects of wireless communication system 100 or 200. The transmit chain 500 may be implemented at a base station (e.g., a base station 105 of FIG. 1 or 2), although the concepts provided herein may be applied to any NOMA receiver.

In this example, antenna 505 (which may include one or more antenna elements) may receive RF signals and provide the RF signals to RF transmit/receive components 510, which may apply various filtering and power amplification functions and provide the received signals to resource de-mapping component 515. Resource de-mapping component 515 may de-map the received signals based on NOMA resources that are mapped to a group of NOMA transmitters, and may provide de-mapped signals to a NOMA multi user decoder (MUD) 520. The MUD 520 may decode the received signals according to NOMA decoding techniques (e.g., SIC, RMSA, etc.), and provide a number (N) of spreading sequences of modulation symbols $\{s_n(1)d(1), s_n(2)d(1), \ldots s_n(K)d(1)\}$ that may be processed serially or in parallel. For each of the number of spreading sequences of modulation symbols, sequence de-spreading component 530 may de-spread the symbols to provide a sequence of modulation symbols $\{d(1)\}$ for each of the NOMA transmitters that had concurrently transmit using the configured NOMA resources. In some cases, each spreading sequence may be a signature sequence for a particular NOMA transmitter that may be randomly selected by the transmitter or that may be assigned to each transmitter. The sequence of modulation symbols may be provided to demodulator 535 which may demodulate the symbols in accordance with the MCS used by the transmitters. The demodulated data may be provided to channel decoding component 540, which may decode the data in accordance with channel coding that was used for the transmissions, and may output the downlink data to a data sink within the receiver.

Figure 6:
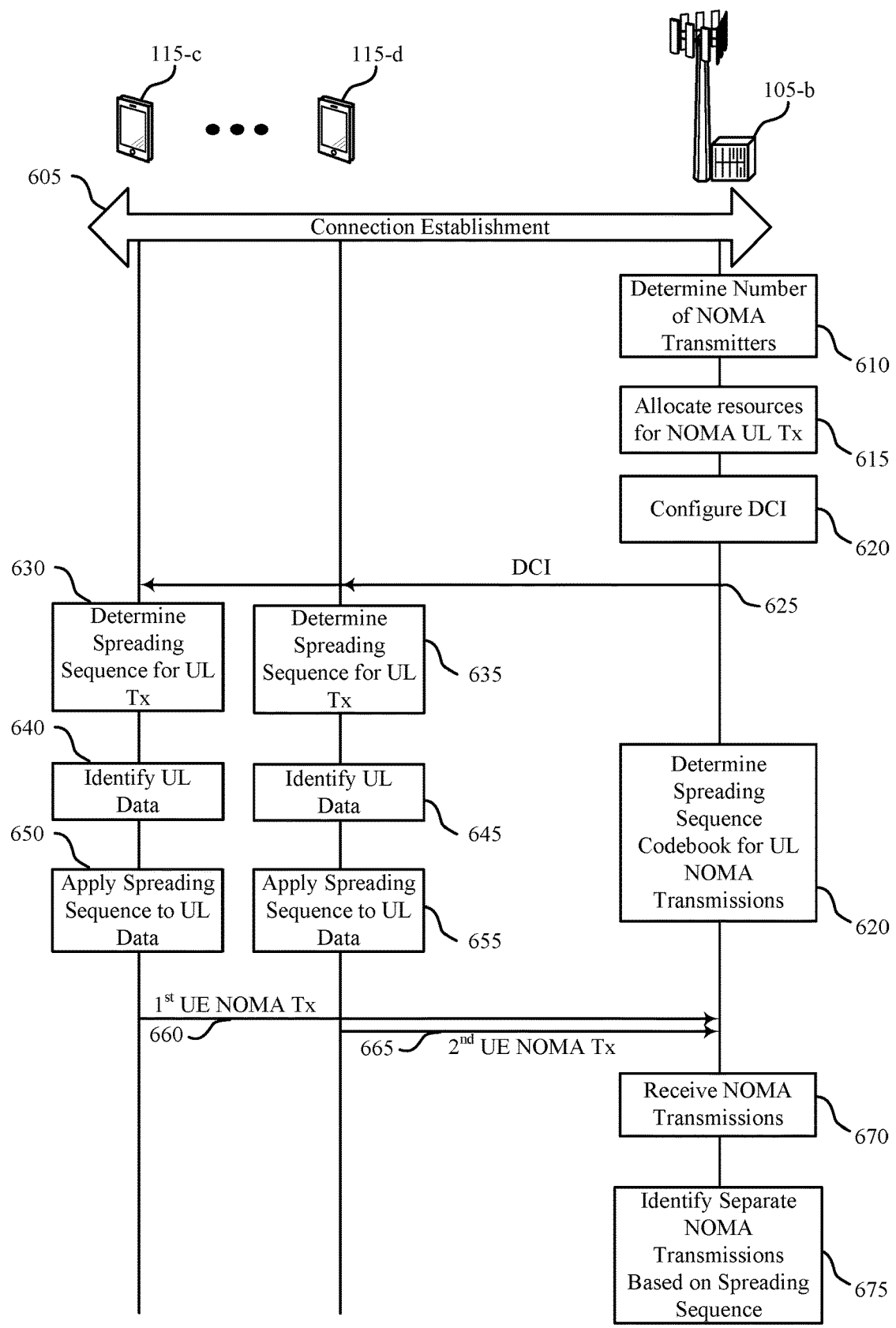
FIG. 6 illustrates an example of a process flow that supports signal spreading techniques for non-orthogonal multiple access wireless communications in accordance with aspects of the present disclosure.

FIG. 6 illustrates an example of a process flow 600 that supports signal spreading techniques for non-orthogonal multiple access wireless communications in accordance with various aspects of the present disclosure. In some examples, process flow 600 may be implemented in aspects of wireless communication system 100 or 200. Process flow 600 may include a base station 105-b, a first UE 115-c, and a second UE 115-d. The base station 105-b may be an example of a base station 105 of FIG. 1 or 2, and the UEs 115 may be examples of UEs 115 of FIG. 1 or 2. Initially, the base station 105-b may perform a connection establishment 605 according to established connection establishment techniques. In some cases, the base station 105-b may configure the UEs 115 for NOMA transmissions as part of a NOMA transmission group.

At 610, the base station 105-b may determine a number of NOMA transmitters that may transmit in a NOMA transmitter group. In some cases, the number of NOMA transmitters may be determined based on a number of UEs 115 that are to be served, a number of available resources for transmissions, a target overloading factor, or any combination thereof.

At 615, the base station 150-b may allocate resources for a NOMA uplink transmission. The base station 105-b may allocate resources in one or more dimensions, including time, frequency, or spatial dimensions, or any combination thereof. In some cases, the allocated resources may include a number of OFDM symbols or RBs and the number and configuration of resources may be used, in conjunction with a number of transmitters in a NOMA transmitter group, to identify a codebook of spreading sequences. The number and configuration of resources may be used, in some cases, as an index into the identified codebook of spreading sequences.

At 620, the base station 105-b may configure downlink control information (DCI) for transmission to the UEs 115, and may transmit the DCI 625 to the UEs 115. The DCI 625 may include an indication of the allocated NOMA resources, an MCS to be used for the NOMA transmissions, and an indication of a number of expected NOMA transmitters, for example.

At 630, the first UE 115-c may determine a spreading sequence for an uplink NOMA transmission. Similarly, at 635, the second UE 115-d may determine a spreading sequence for the uplink NOMA transmission. The UE 115-d may determine the spreading sequence as discussed herein, by identifying a spreading sequence from a codebook of spreading sequences. In some cases, a particular codebook may be identified based on a number and configuration of the allocated NOMA resources and a number of expected NOMA transmitters. A particular spreading sequence at each UE 115 may be determined based on an index into the codebook for the particular UE 115. In some cases, the base station 105-b may provide the value of the index for each UE 115. In other cases, each UE 115 may randomly select the value of the index to identify a spreading sequence from the codebook.

At 640, the first UE 115-c may identify uplink data for a NOMA transmission. Similarly, at 645, the second UE 115-d may identify uplink data for a NOMA transmission. The uplink data may be data from a transmit buffer at each UE 115, for example.

At 650, the first UE 115-c may apply its identified spreading sequence to its uplink data. Similarly, at 655, the second UE 115-d may apply its spreading sequence to its uplink data. After applying the respective spreading sequences to the uplink data, each UE 115 may perform resource mapping and may transmit their respective uplink transmissions, such as discussed herein. In the example of FIG. 6, the first UE 115-c may transmit a first UE NOMA transmission 660 using the same allocated uplink resources as the second UE 115-d for transmission of a second UE NOMA transmission 665.

At 670, the base station 105-b may receive the NOMA transmissions. As discussed herein, when receiving NOMA transmissions, the base station 105-b may perform NOMA processing, such as SIC/RMSA processing at a MUD to identity a number of separate NOMA transmissions.

At 675, the base station 105-b may identify separate NOMA transmissions based on the spreading sequences applied to the NOMA transmissions. In some cases, the received transmissions may be de-spread in accordance with the available spreading sequences to generate a number of sets of modulation symbols that may be decoded by the base station 105-b to generate uplink data that was transmitted by each UE 115.

Figure 7:
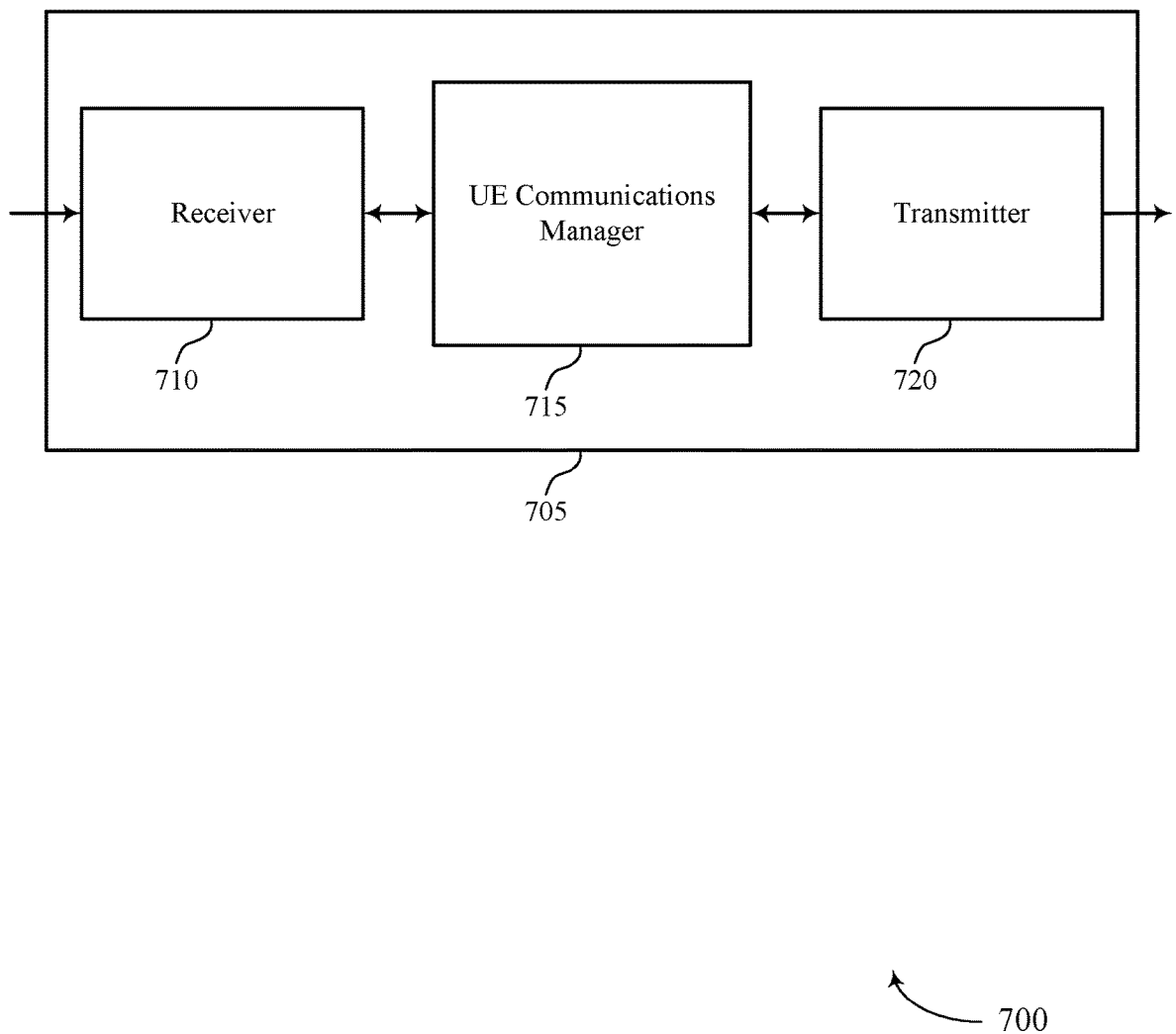
FIGS. 7 through 9 show block diagrams of a device that supports signal spreading techniques for non-orthogonal multiple access wireless communications in accordance with aspects of the present disclosure.

FIG. 7 shows a block diagram 700 of a wireless device 705 that supports signal spreading techniques for non-orthogonal multiple access wireless communications in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to signal spreading techniques for non-orthogonal multiple access wireless communications, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, from a base station, an indication of a set of common resources for an uplink transmission and a number of transmitters in a group of non-orthogonal multiple access (NOMA) transmitters configured for concurrent transmissions using the set of common resources, determine, based on the set of common resources and the number of transmitters, a spreading sequence for the uplink transmission, identify data to be transmitted in the uplink transmission, apply the spreading sequence to the data to be transmitted in the uplink transmission, and transmit the uplink transmission to the base station.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
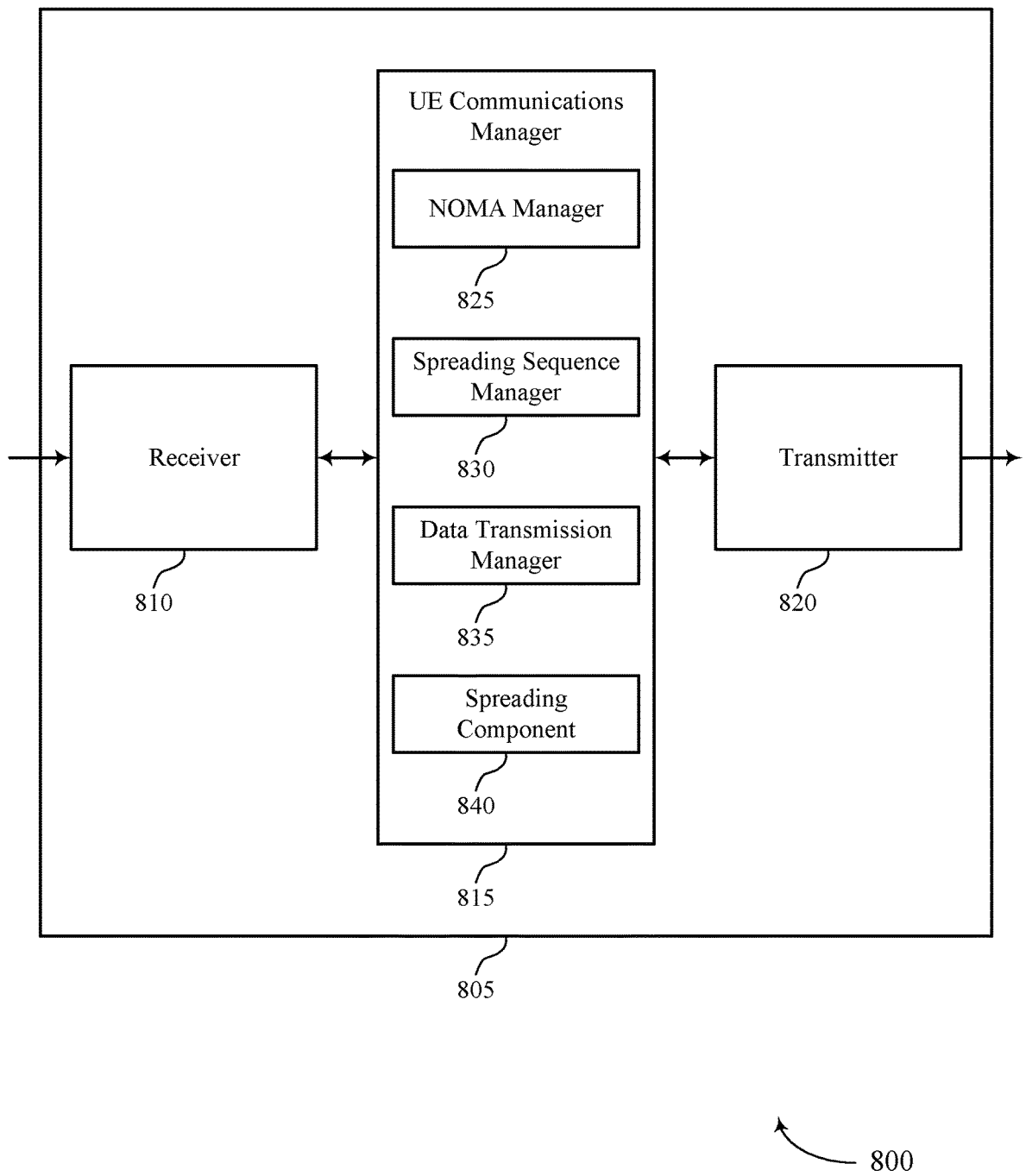

FIG. 8 shows a block diagram 800 of a wireless device 805 that supports signal spreading techniques for non-orthogonal multiple access wireless communications in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to signal spreading techniques for non-orthogonal multiple access wireless communications, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include NOMA manager 825, spreading sequence manager 830, data transmission manager 835, and spreading component 840.

NOMA manager 825 may receive, from a base station, an indication of a set of common resources for an uplink transmission and a number of transmitters in a group of NOMA transmitters configured for concurrent transmissions using the set of common resources. In some cases, the set of common resources includes frequency resources, time resources, spatial resources, or any combination thereof. In some cases, the set of common resources and the number of transmitters in the group of NOMA transmitters is received from the base station in a master information block (MIB), in a system information block (SIB), in remaining minimum system information (RMSI), in a group common PDCCH, or any combination thereof.

Spreading sequence manager 830 may determine, based on the set of common resources and the number of transmitters, a spreading sequence for the uplink transmission. In some cases, spreading sequence manager 830 may identify a set of codebooks that each include a set of spreading sequences, with each of the set of codebooks indexed according to numbers of resources and numbers of transmitters. Spreading sequence manager 830 may select a first codebook of the set of codebooks based on a first index value associated with a number and a configuration of resources in the set of common resources and a second index value associated with the number of transmitters in the group of NOMA transmitters. In some cases, the spreading sequence is determined using a closed form expression in which each of a set of available spreading sequences can be determined based on a number and a configuration of resources in the set of common resources and an expected number of transmitters in the group of NOMA transmitters. In some examples, the closed form expression may be a modified TRP sequence. In some cases, the spreading sequence is a polyphase sequence that is a function of a number and a configuration of resources of the set of common resources and a selected transmitter of the number of transmitters in the group of NOMA transmitters. In some cases, the selected transmitter is randomly selected or received from the base station.

Data transmission manager 835 may identify data to be transmitted in the uplink transmission and transmit the uplink transmission to the base station.

Spreading component 840 may apply the spreading sequence to the data to be transmitted in the uplink transmission. In some cases, the spreading sequence is applied to each modulation symbol of the series of modulation symbols.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
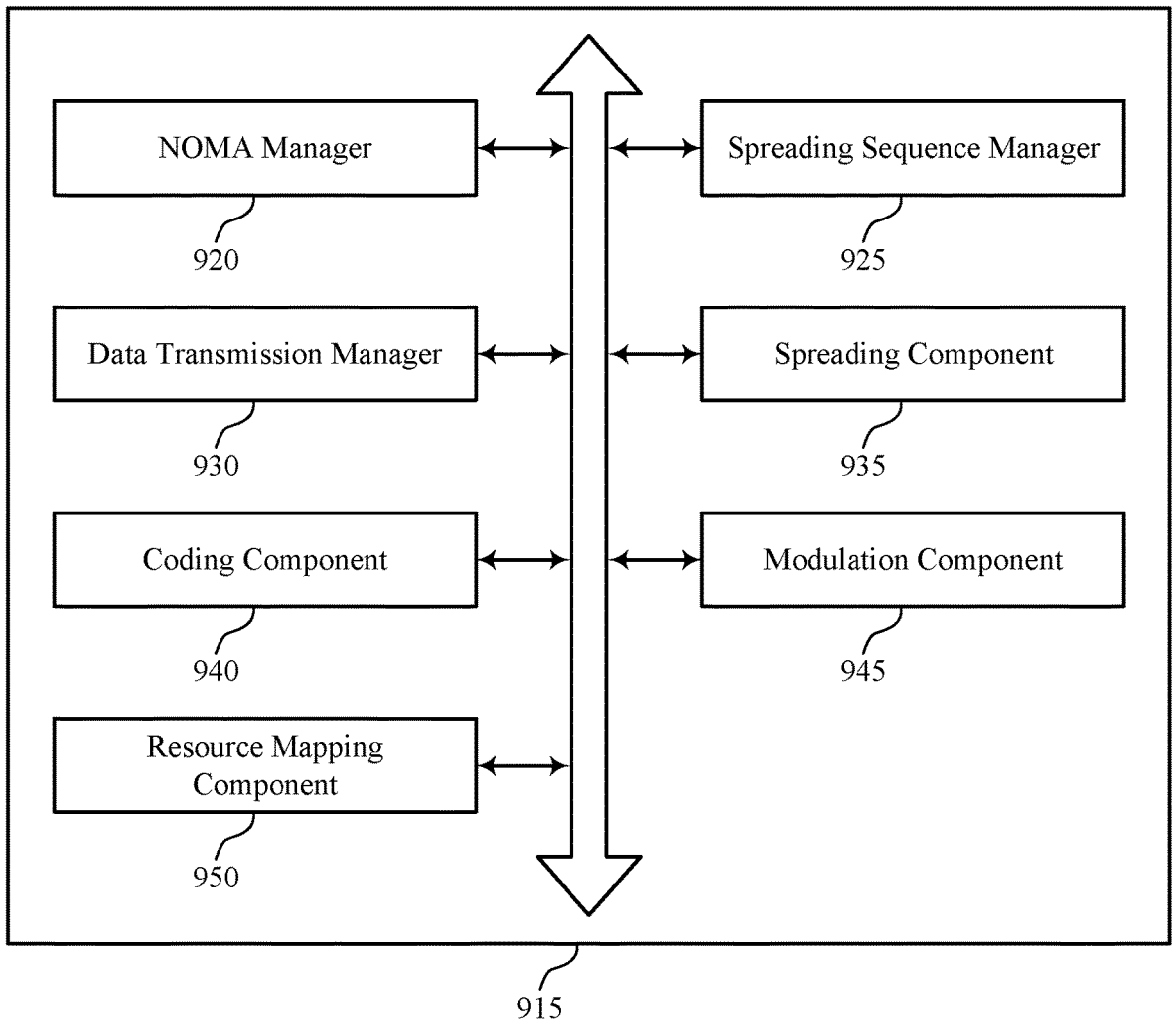

FIG. 9 shows a block diagram 900 of a UE communications manager 915 that supports signal spreading techniques for non-orthogonal multiple access wireless communications in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include NOMA manager 920, spreading sequence manager 925, data transmission manager 930, spreading component 935, coding component 940, modulation component 945, and resource mapping component 950. Each of these modules may communicate, directly or indirectly, with one another (e.g., via one or more buses).

NOMA manager 920 may receive, from a base station, an indication of a set of common resources for an uplink transmission and a number of transmitters in a group of NOMA transmitters configured for concurrent transmissions using the set of common resources. In some cases, the set of common resources includes frequency resources, time resources, spatial resources, or any combination thereof. In some cases, the set of common resources and the number of transmitters in the group of NOMA transmitters is received from the base station in a master information block (MIB), in a system information block (SIB), in remaining minimum system information (RMSI), in a group common PDCCH, or any combination thereof.

Spreading sequence manager 925 may determine, based on the set of common resources and the number of transmitters, a spreading sequence for the uplink transmission. In some cases, spreading sequence manager 925 may identify a set of codebooks that each include a set of spreading sequences, each of the set of codebooks indexed according to numbers of resources and numbers of transmitters. Spreading sequence manager 925 may select a first codebook of the set of codebooks based on a first index value associated with a number and a configuration of resources in the set of common resources and a second index value associated with the number of transmitters in the group of NOMA transmitters. In some cases, the spreading sequence is determined using a closed form expression in which each of a set of available spreading sequences can be determined based on a number and a configuration of resources in the set of common resources and an expected number of transmitters in the group of NOMA transmitters. In some cases, the closed form expression may be a modified TRP sequence. In some cases, the spreading sequence is a polyphase sequence that is a function of a number and a configuration of resources of the set of common resources and a selected transmitter of the number of transmitters in the group of NOMA transmitters. In some cases, the selected transmitter is randomly selected or received from the base station.

Data transmission manager 930 may identify data to be transmitted in the uplink transmission and transmit the uplink transmission to the base station.

Spreading component 935 may apply the spreading sequence to the data to be transmitted in the uplink transmission. In some cases, the spreading sequence is applied to each modulation symbol of the series of modulation symbols.

Coding component 940 may perform channel coding of uplink data to be transmitted, to generate channel coded data. Modulation component 945 may modulate the channel coded data to generate a series of modulation symbols, which may be spread by spreading component 935 according to the spreading sequence. Resource mapping component 950 may map the spread series of modulation symbols to resources of the set of common resources, where the resources include frequency resources, time resources, spatial resources, or any combination thereof.

Figure 10:
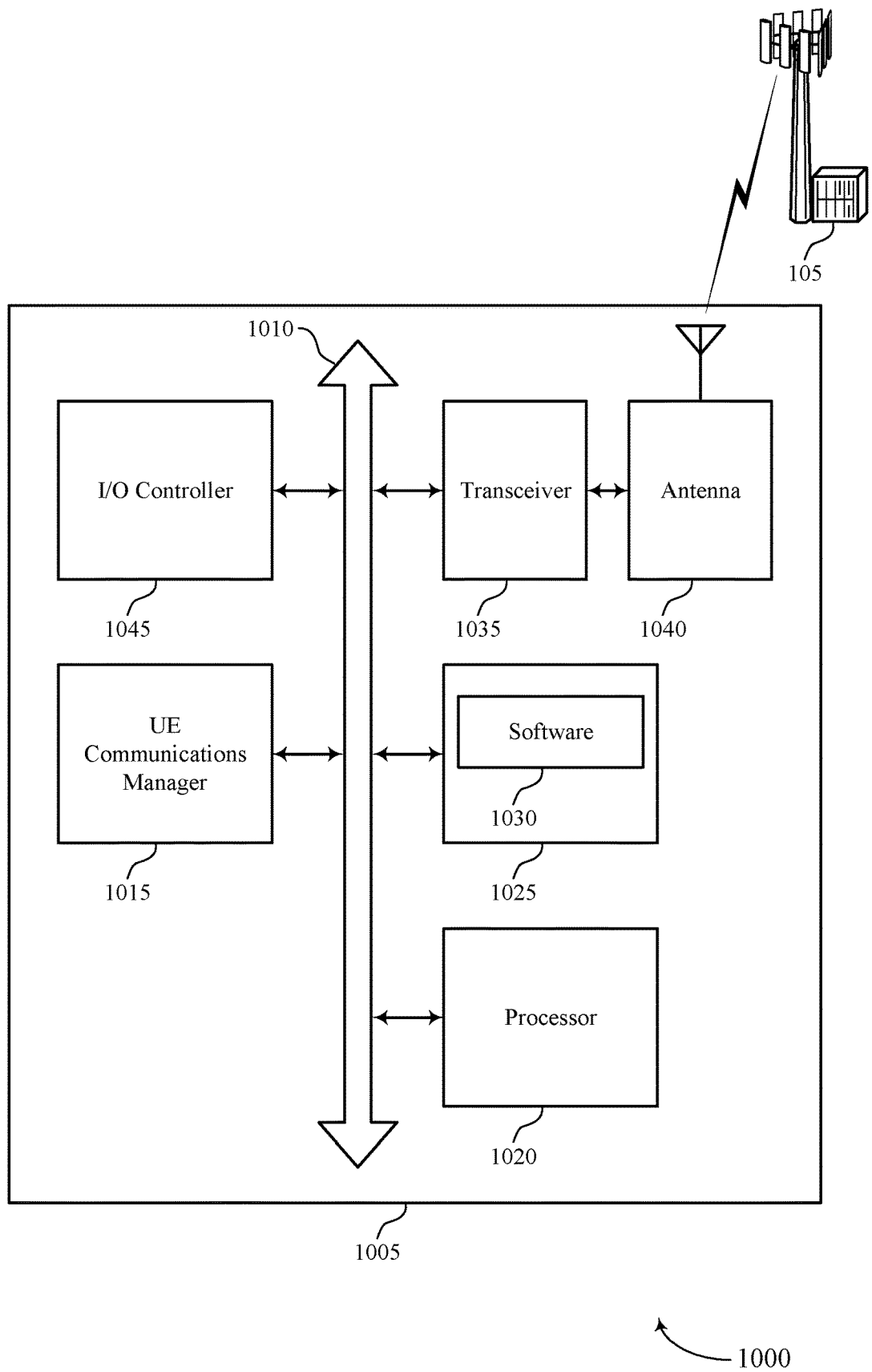
FIG. 10 illustrates a block diagram of a system including a UE that supports signal spreading techniques for non-orthogonal multiple access wireless communications in accordance with aspects of the present disclosure.

FIG. 10 shows a diagram of a system 1000 including a device 1005 that supports signal spreading techniques for non-orthogonal multiple access wireless communications in accordance with aspects of the present disclosure. Device 1005 may be an example of or include the components of wireless device 705, wireless device 805, or a UE 115 as described herein, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting signal spreading techniques for non-orthogonal multiple access wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support signal spreading techniques for non-orthogonal multiple access wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
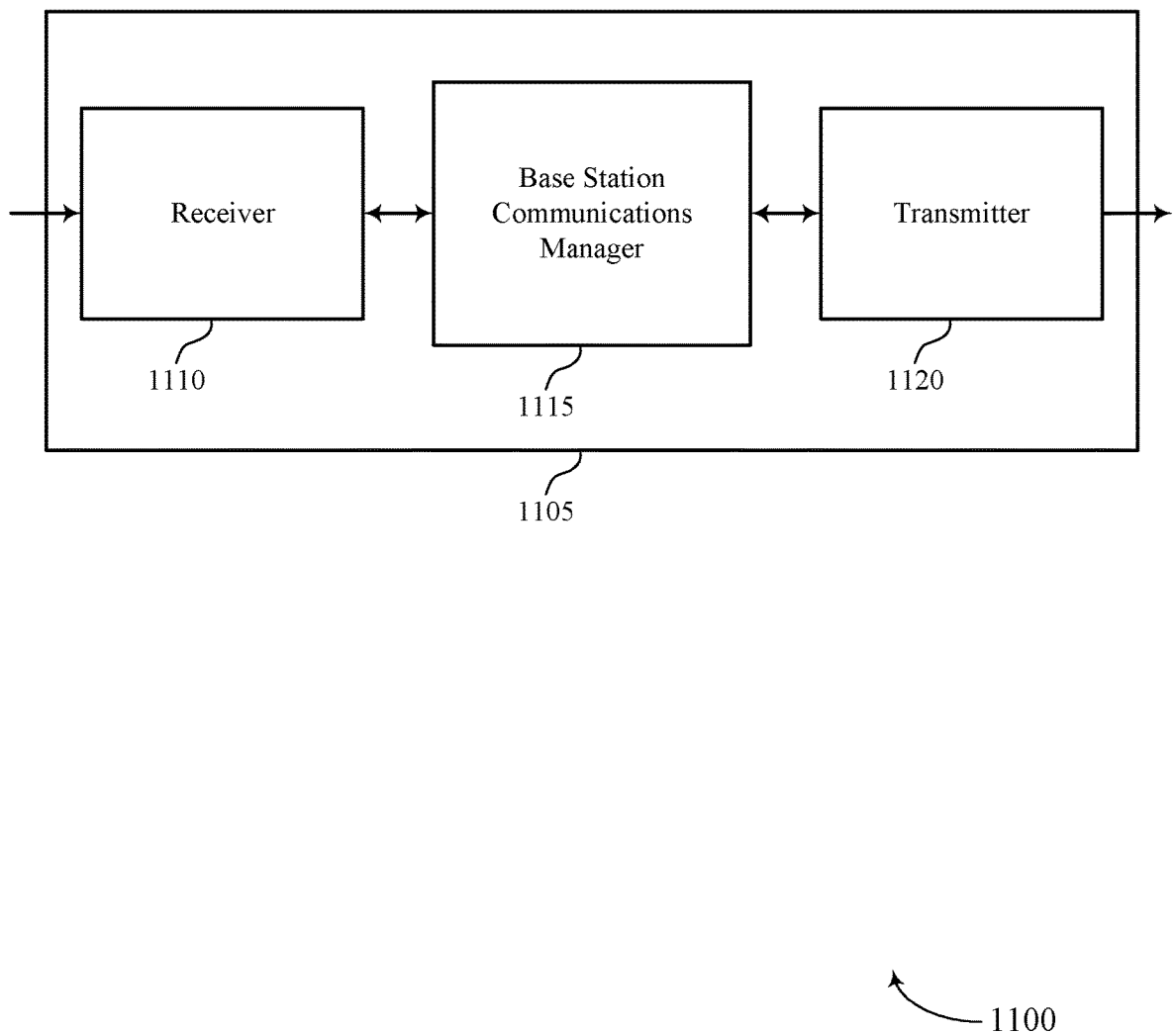
FIGS. 11 through 13 show block diagrams of a device that supports signal spreading techniques for non-orthogonal multiple access wireless communications in accordance with aspects of the present disclosure.

FIG. 11 shows a block diagram 1100 of a wireless device 1105 that supports signal spreading techniques for non-orthogonal multiple access wireless communications in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to signal spreading techniques for non-orthogonal multiple access wireless communications, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a group of transmitters configured for concurrent NOMA transmissions, allocate a set of uplink resources for concurrent NOMA transmissions, transmit, to the group of transmitters, an indication of the set of uplink resources and a number of transmitters in the group of transmitters, determine, based on the set of common resources and the number of transmitters, a spreading sequence codebook for uplink transmissions using the set of uplink resources, the spreading sequence codebook including a set of spreading sequences for uplink transmissions using the set of common resources, receive at least two concurrent NOMA transmissions from at least two transmitters of the group of transmitters on same resources within the set of uplink resources, and identify which transmitter of the group of transmitters transmitted each of the at least two concurrent NOMA transmissions, based on spreading sequences from the spreading sequence codebook that are applied to each of the concurrent NOMA transmissions. In some cases, the identifying is based on an index assigned to each UE of the group of transmitters.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
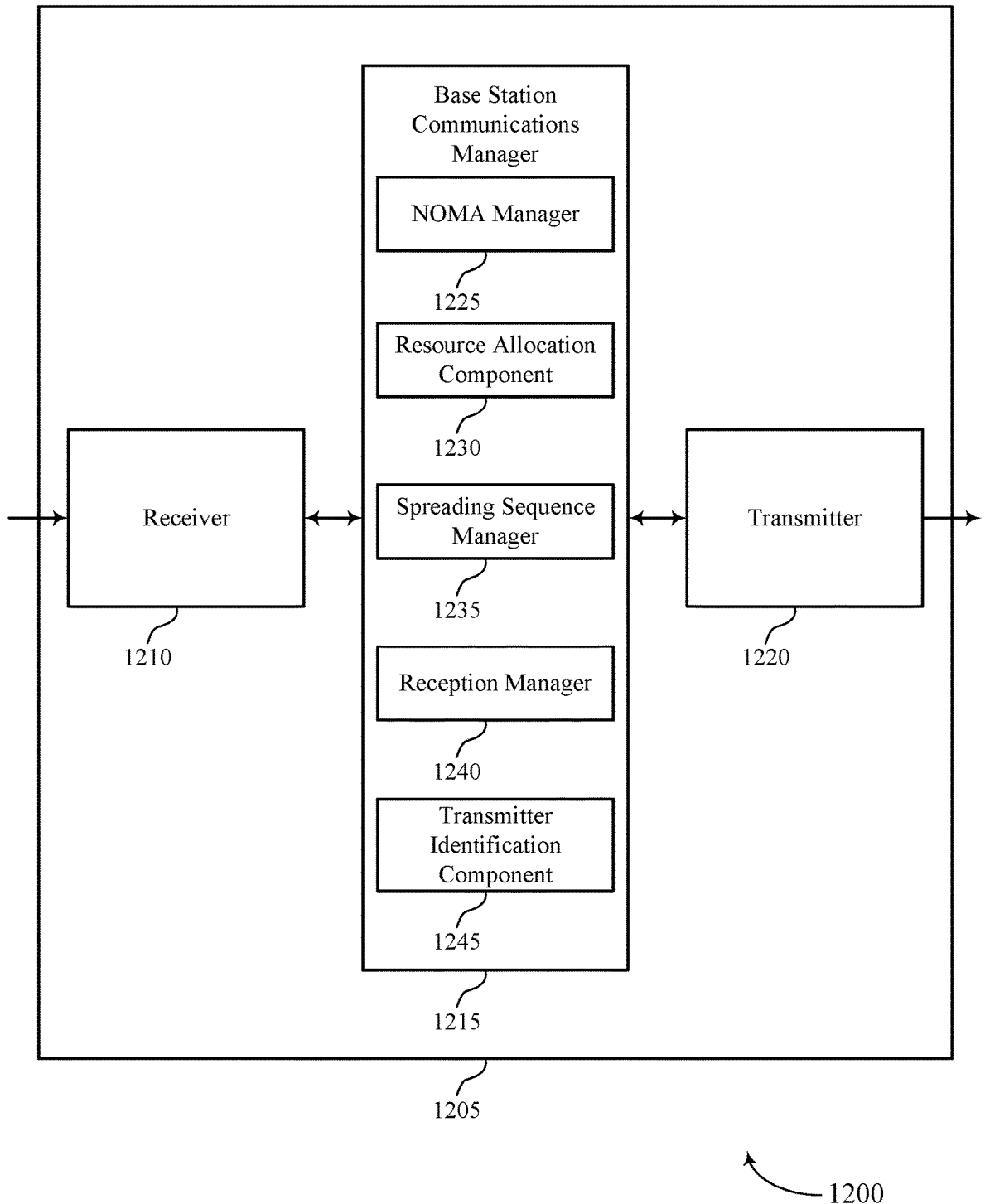

FIG. 12 shows a block diagram 1200 of a wireless device 1205 that supports signal spreading techniques for non-orthogonal multiple access wireless communications in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to signal spreading techniques for non-orthogonal multiple access wireless communications, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include NOMA manager 1225, resource allocation component 1230, spreading sequence manager 1235, reception manager 1240, and transmitter identification component 1245.

NOMA manager 1225 may identify a group of transmitters configured for concurrent NOMA transmissions and transmit, to the group of transmitters, an indication of the set of uplink resources and a number of transmitters in the group of transmitters. In some cases, the set of common resources include a set of shared resources, and where the set of shared resources, a configuration and size of the spreading sequence codebook, and a spreading scheme is transmitted in a MIB, in a SIB, in RMSI, in a payload of a group common physical downlink control channel (PDCCH) transmission, or any combination thereof.

Resource allocation component 1230 may allocate a set of uplink resources for concurrent NOMA transmissions. In some cases, the set of common resources includes frequency resources, time resources, spatial resources, or any combination thereof.

Spreading sequence manager 1235 may determine, based on the set of common resources and the number of transmitters, a spreading sequence codebook for uplink transmissions using the set of uplink resources, the spreading sequence codebook including a set of spreading sequences for uplink transmissions using the set of common resources. In some cases, spreading sequence manager 1235 may identify a set of codebooks that each include a set of spreading sequences, each of the set of codebooks indexed according to numbers of resources, configuration of resources, and numbers of transmitters. In some cases, the set of spreading sequences is determined using a closed form expression in which each of the set of spreading sequences may be determined based on a number of resources in the set of common resources and the number of transmitters in the group of transmitters. In some cases, the closed form expression may be a modified TRP sequence. In some cases, the spreading sequences are polyphase sequences that are a function of a number of resources and a selected transmitter identity for transmitters of the group of transmitters. In some cases, spreading sequence manager 1235 may select a first codebook of the set of codebooks based on a first index value associated with a number of resources in the set of common resources and a second index value associated with the number of transmitters in the group of transmitters.

Reception manager 1240 may receive at least two concurrent NOMA transmissions from at least two transmitters of the group of transmitters on same resources within the set of uplink resources.

Transmitter identification component 1245 may determine a spreading sequence applied to each spreading set of modulation symbols, identify which transmitter of the group of transmitters that transmitted each received transmission based on the determined spreading sequence from the spreading sequence codebook applied to each of the concurrent NOMA transmissions.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
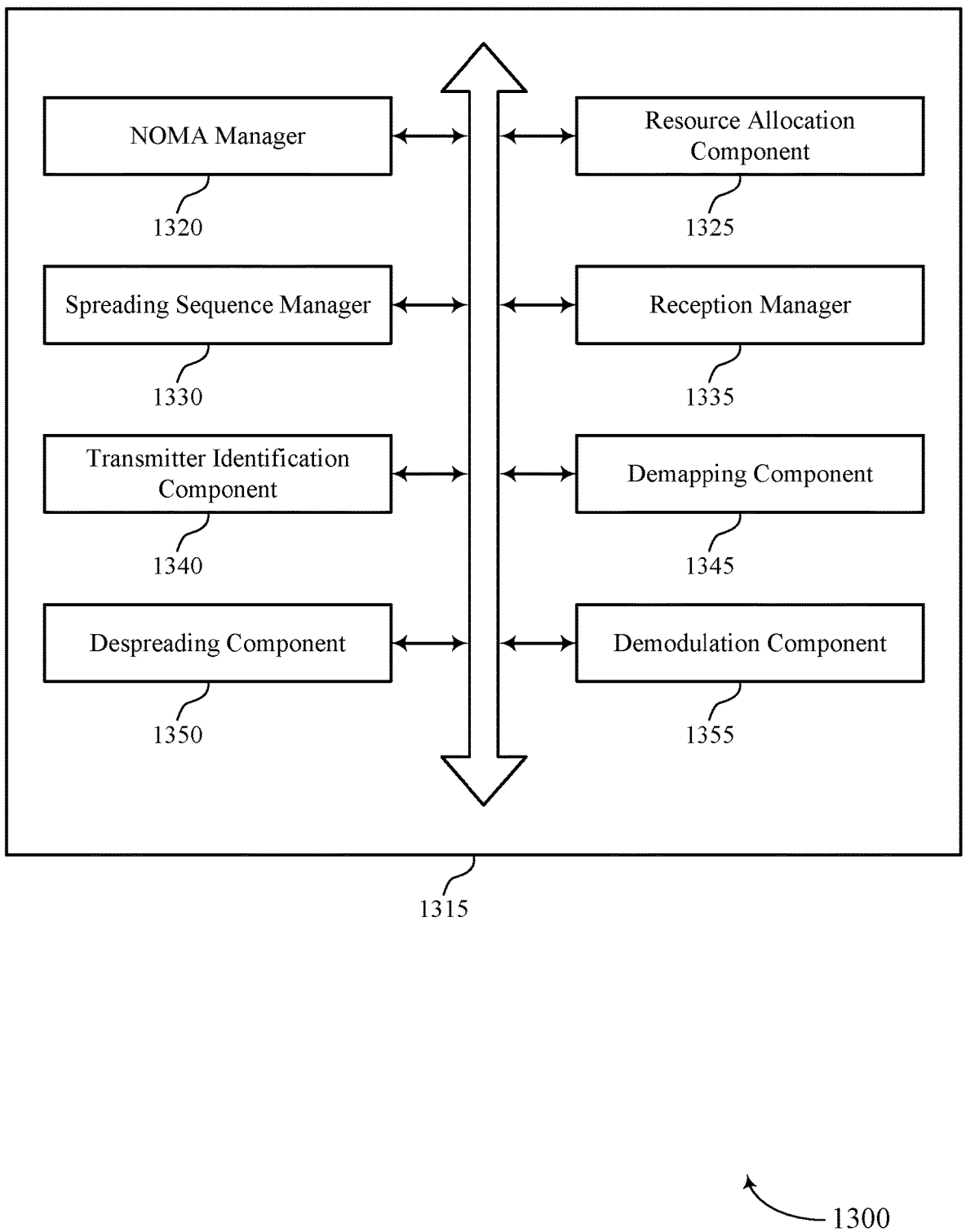

FIG. 13 shows a block diagram 1300 of a base station communications manager 1315 that supports signal spreading techniques for non-orthogonal multiple access wireless communications in accordance with aspects of the present disclosure. The base station communications manager 1315 may be an example of aspects of a base station communications manager 1415 described with reference to FIGS. 11, 12, and 14. The base station communications manager 1315 may include NOMA manager 1320, resource allocation component 1325, spreading sequence manager 1330, reception manager 1335, transmitter identification component 1340, de-mapping component 1345, de-spreading component 1350, and demodulation component 1355. Each of these modules may communicate, directly or indirectly, with one another (e.g., via one or more buses).

NOMA manager 1320 may identify a group of transmitters configured for concurrent NOMA transmissions and transmit, to the group of transmitters, an indication of the set of uplink resources and a number of transmitters in the group of transmitters. In some cases, the set of common resources include a set of shared resources, where the set of shared resources, a configuration and size of the spreading sequence codebook, and a spreading scheme is transmitted in a MIB, in a SIB, in RMSI, in a payload of a group common physical downlink control channel (PDCCH) transmission, or any combination thereof.

Resource allocation component 1325 may allocate a set of uplink resources for concurrent NOMA transmissions. In some cases, the set of common resources includes frequency resources, time resources, spatial resources, or any combination thereof.

Spreading sequence manager 1330 may determine, based on the set of common resources and the number of transmitters, a spreading sequence codebook for uplink transmissions using the set of uplink resources, the spreading sequence codebook including a set of spreading sequences for uplink transmissions using the set of common resources. In some cases, spreading sequence manager 1330 may identify a set of codebooks that each include a set of spreading sequences, each of the set of codebooks indexed according to numbers of resources, configuration of resources, and numbers of transmitters. In some cases, the set of spreading sequences are determined using a closed form expression in which each of the set of spreading sequences can be determined based on a number of resources in the set of common resources and the number of transmitters in the group of transmitters. In some cases, the closed form expression may be a modified TRP sequence. In some cases, the spreading sequences are polyphase sequences that are a function of a number of resources and a selected transmitter identity for transmitters of the group of transmitters. In some cases, spreading sequence manager 1330 may select a first codebook of the set of codebooks based on a first index value associated with a number of resources in the set of common resources and a second index value associated with the number of transmitters in the group of transmitters.

Reception manager 1335 may receive at least two concurrent NOMA transmissions from at least two transmitters of the group of transmitters on same resources within the set of uplink resources.

Transmitter identification component 1340 may determine a spreading sequence applied to each spreading set of modulation symbols, identify which transmitter of the group of transmitters transmitted each received transmission based on the determined spreading sequence from the spreading sequence codebook that are applied to each of the concurrent NOMA transmissions.

De-mapping component 1345 may de-map received transmissions from the set of common resources to generate a de-spread set of modulation symbols. De-spreading component 1350 may combine the de-spread set of modulation symbols based on the set of spreading sequences in the spreading sequence codebook. Demodulation component 1355 may demodulate and decode the set of modulation symbols.

Figure 14:
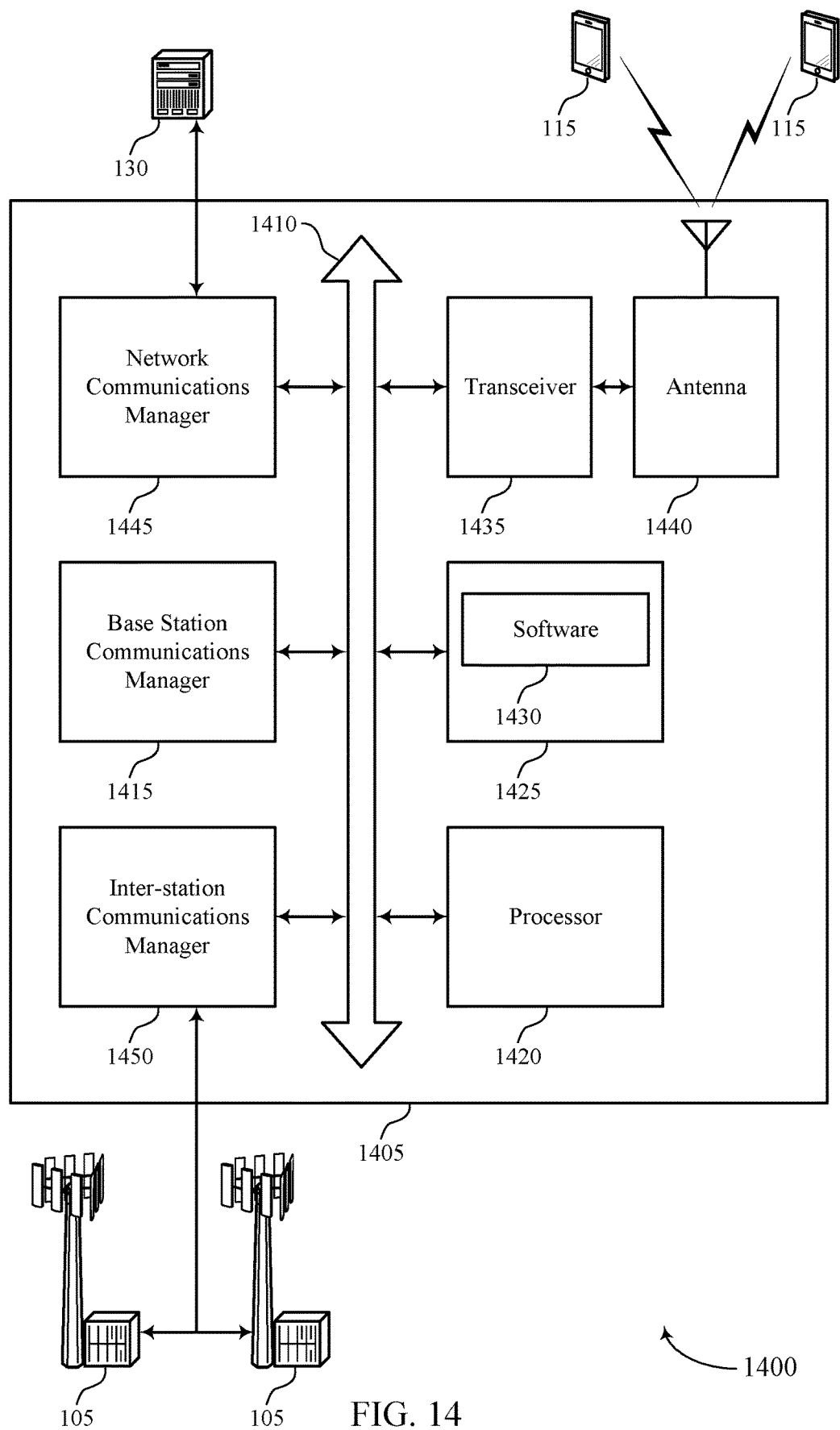
FIG. 14 illustrates a block diagram of a system including a base station that supports signal spreading techniques for non-orthogonal multiple access wireless communications in accordance with aspects of the present disclosure.

FIG. 14 shows a diagram of a system 1400 including a device 1405 that supports signal spreading techniques for non-orthogonal multiple access wireless communications in accordance with aspects of the present disclosure. Device 1405 may be an example of or include the components of base station 105 as described herein, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting signal spreading techniques for non-orthogonal multiple access wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support signal spreading techniques for non-orthogonal multiple access wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
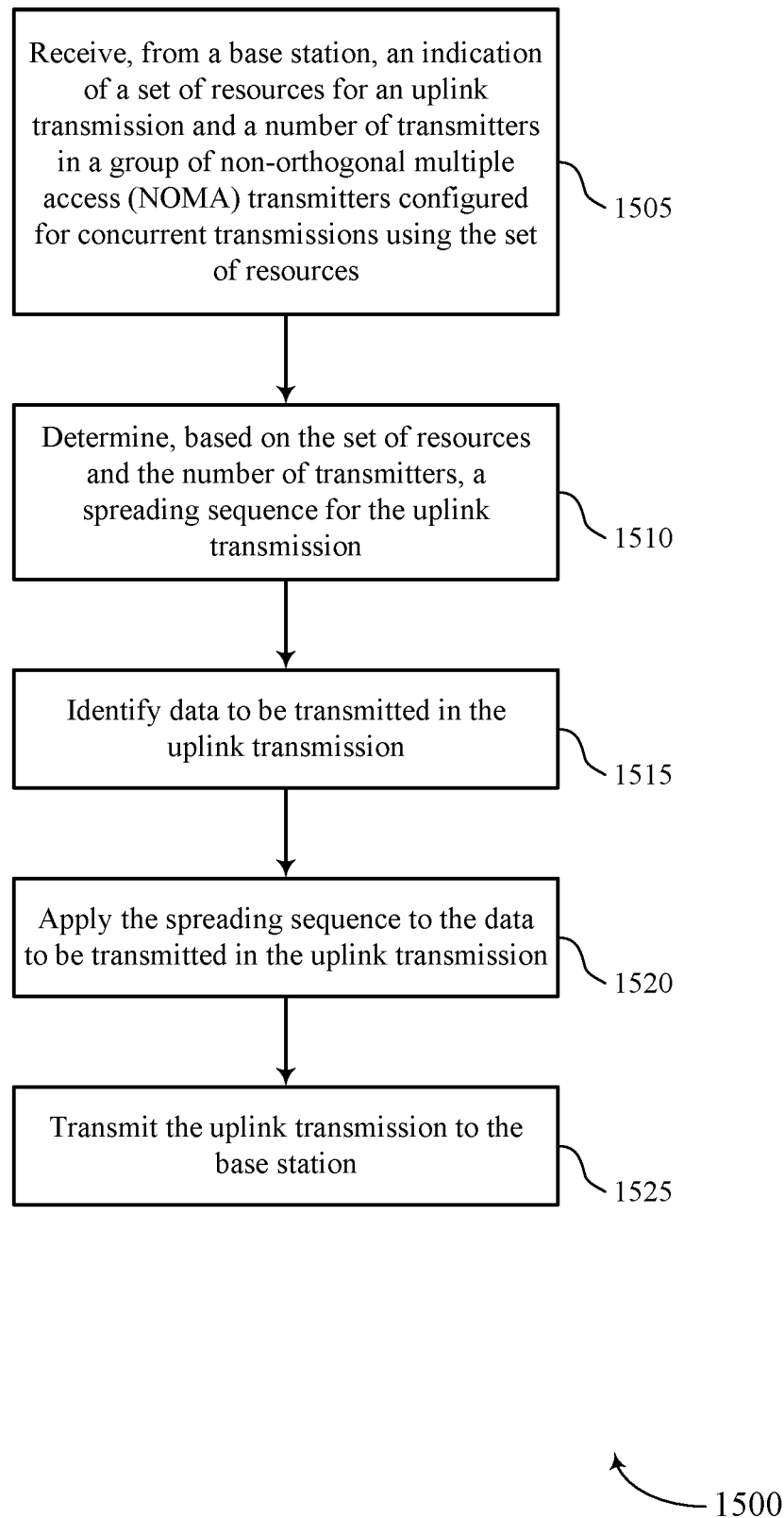
FIGS. 15 through 20 illustrate methods for signal spreading techniques for non-orthogonal multiple access wireless communications in accordance with aspects of the present disclosure.

FIG. 15 shows a flowchart illustrating a method 1500 for signal spreading techniques for non-orthogonal multiple access wireless communications in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive, from a base station, an indication of a set of common resources for an uplink transmission and a number of transmitters in a group of NOMA transmitters configured for concurrent transmissions using the set of common resources. The operations of 1505 may be performed according to the methods described herein. In certain examples, aspects of the operations of 1505 may be performed by a NOMA manager as described with reference to FIGS. 7 through 10.

At 1510 the UE 115 may determine, based on the set of common resources and the number of transmitters, a spreading sequence for the uplink transmission. The operations of 1510 may be performed according to the methods described herein. In certain examples, aspects of the operations of 1510 may be performed by a spreading sequence manager as described with reference to FIGS. 7 through 10.

At 1515 the UE 115 may identify data to be transmitted in the uplink transmission. The operations of 1515 may be performed according to the methods described herein. In certain examples, aspects of the operations of 1515 may be performed by a data transmission manager as described with reference to FIGS. 7 through 10.

At 1520 the UE 115 may apply the spreading sequence to the data to transmit in the uplink transmission. The operations of 1520 may be performed according to the methods described herein. In certain examples, aspects of the operations of 1520 may be performed by a spreading component as described with reference to FIGS. 7 through 10.

At 1525 the UE 115 may transmit the uplink transmission to the base station. The operations of 1525 may be performed according to the methods described herein. In certain examples, aspects of the operations of 1525 may be performed by a data transmission manager as described with reference to FIGS. 7 through 10.

Figure 16:
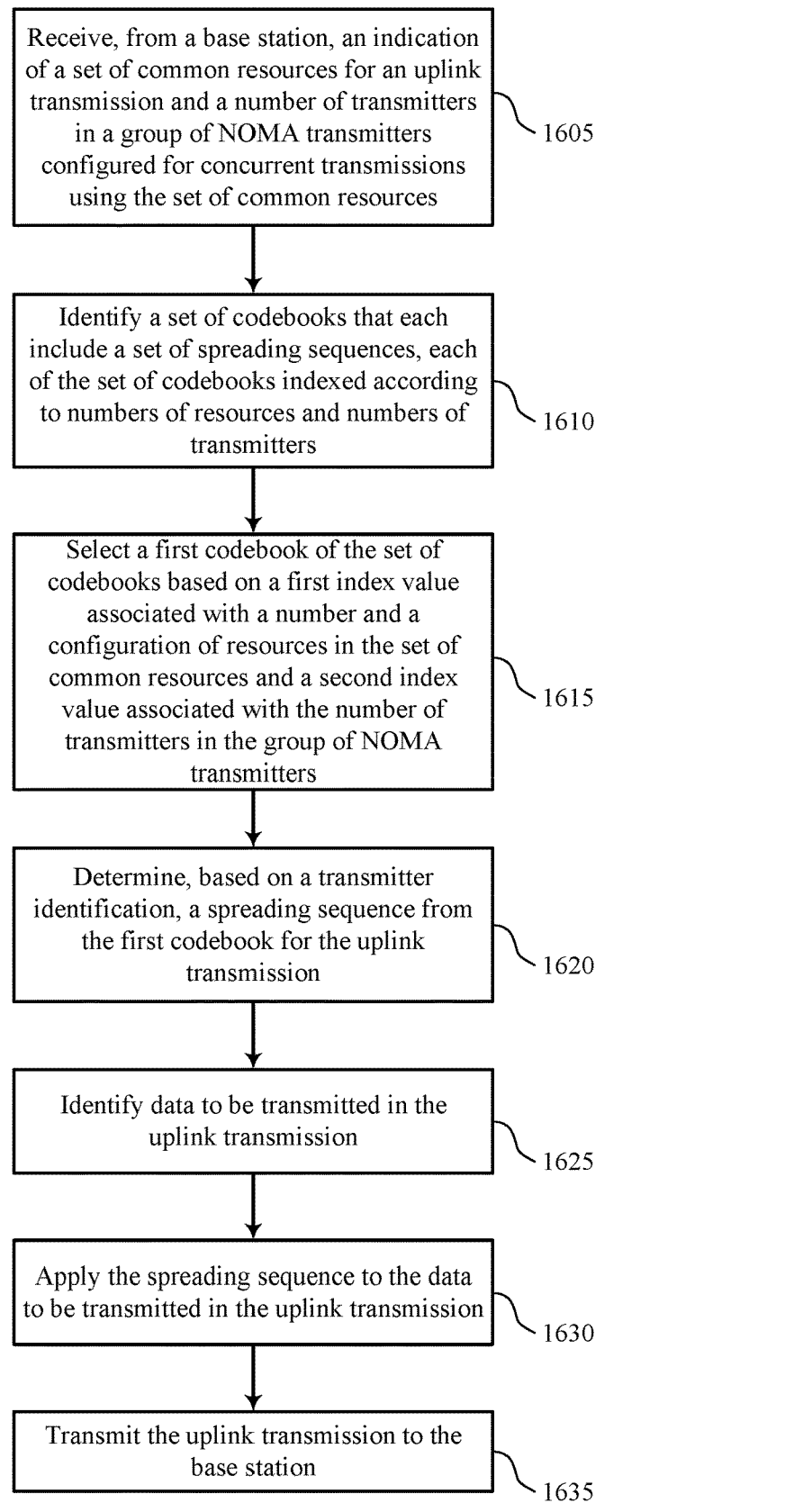

FIG. 16 shows a flowchart illustrating a method 1600 for signal spreading techniques for non-orthogonal multiple access wireless communications in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive, from a base station, an indication of a set of common resources for an uplink transmission and a number of transmitters in a group of NOMA transmitters configured for concurrent transmissions using the set of common resources. The operations of 1605 may be performed according to the methods described herein. In certain examples, a NOMA manager as described with reference to FIGS. 7 through 10 may perform aspects of the operations of 1605.

At 1610 the UE 115 may identify a number of codebooks that each include a number of spreading sequences, each of the number of codebooks indexed according to numbers of resources and numbers of transmitters. The operations of 1610 may be performed according to the methods described herein. In certain examples, aspects of the operations of 1610 may be performed by a spreading sequence manager as described with reference to FIGS. 7 through 10.

At 1615 the UE 115 may select a first codebook of the number of codebooks based on a first index value associated with a number and a configuration of resources in the set of common resources and a second index value associated with the number of transmitters in the group of NOMA transmitters. The operations of 1615 may be performed according to the methods described herein. In certain examples, a spreading sequence manager as described with reference to FIGS. 7 through 10 may perform aspects of the operations of 1615.

At 1620 the UE 115 may determine, based on a transmitter identification, a spreading sequence from the first codebook for the uplink transmission. The operations of 1620 may be performed according to the methods described herein. In certain examples, a spreading sequence manager as described with reference to FIGS. 7 through 10 may perform aspects of the operations of 1620. In some cases, the transmitter identification may be provided by the base station. In other cases, the transmitter identification may be randomly selected.

At 1625 the UE 115 may identify data to be transmitted in the uplink transmission. The operations of 1625 may be performed according to the methods described herein. In certain examples, aspects of the operations of 1625 may be performed by a data transmission manager as described with reference to FIGS. 7 through 10.

At 1630 the UE 115 may apply the spreading sequence to the data to be transmitted in the uplink transmission. The operations of 1630 may be performed according to the methods described herein. In certain examples, aspects of the operations of 1630 may be performed by a spreading component as described with reference to FIGS. 7 through 10. In some cases, the spreading sequence is a polyphase sequence that is a function of a number and a configuration of resources of the set of common resources and a selected transmitter of the number of transmitters in the group of NOMA transmitters.

At 1635 the UE 115 may transmit the uplink transmission to the base station. The operations of 1635 may be performed according to the methods described herein. In certain examples, aspects of the operations of 1635 may be performed by a data transmission manager as described with reference to FIGS. 7 through 10.

Figure 17:
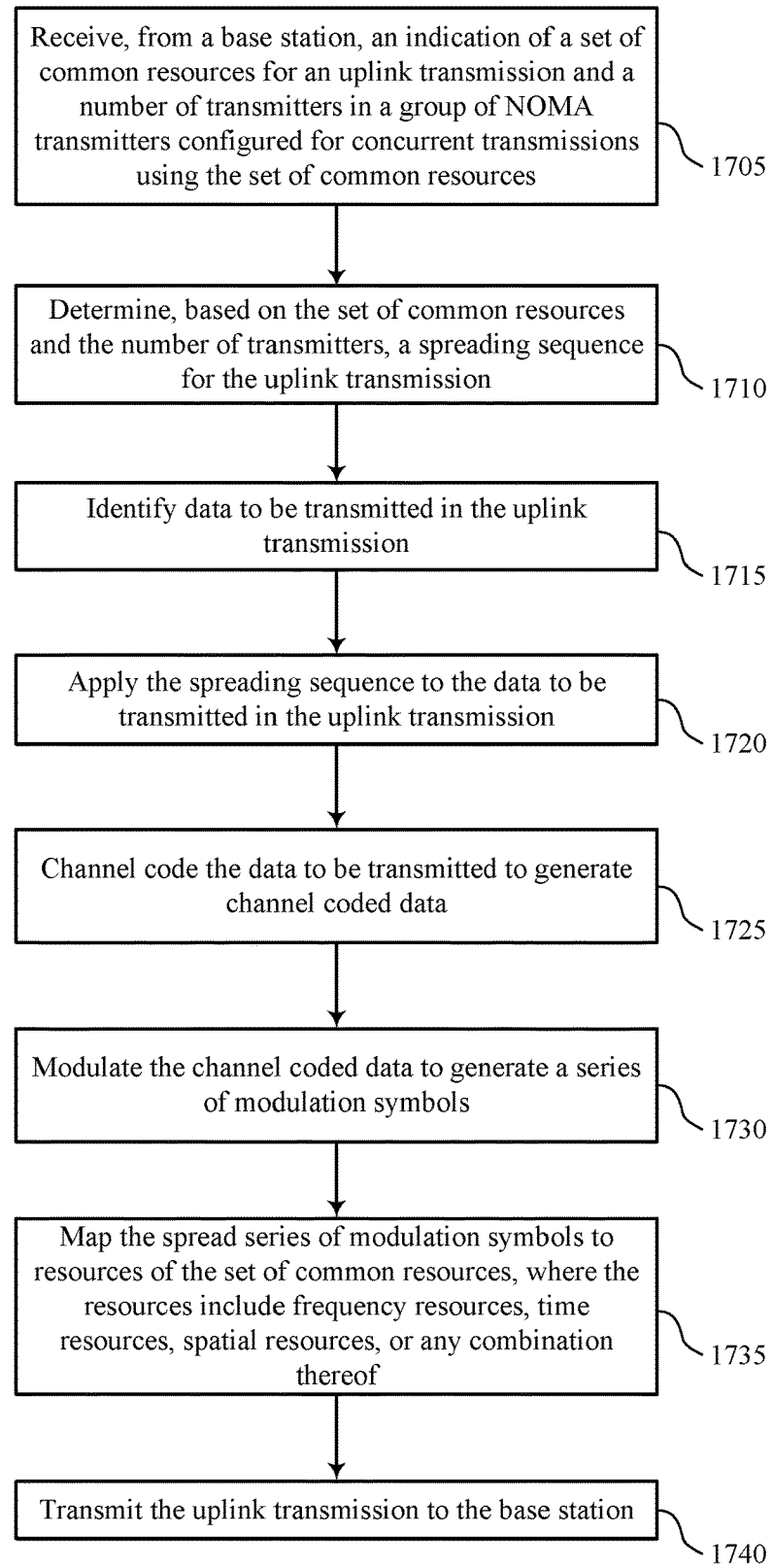

FIG. 17 shows a flowchart illustrating a method 1700 for signal spreading techniques for non-orthogonal multiple access wireless communications in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive, from a base station, an indication of a set of common resources for an uplink transmission and a number of transmitters in a group of NOMA transmitters configured for concurrent transmissions using the set of common resources. The operations of 1705 may be performed according to the methods described herein. In certain examples, aspects of the operations of 1705 may be performed by a NOMA manager as described with reference to FIGS. 7 through 10.

At 1710 the UE 115 may determine, based on the set of common resources and the number of transmitters, a spreading sequence for the uplink transmission. The operations of 1710 may be performed according to the methods described herein. In certain examples, aspects of the operations of 1710 may be performed by a spreading sequence manager as described with reference to FIGS. 7 through 10.

At 1715 the UE 115 may identify data to be transmitted in the uplink transmission. The operations of 1715 may be performed according to the methods described herein. In certain examples, aspects of the operations of 1715 may be performed by a data transmission manager as described with reference to FIGS. 7 through 10.

At 1720 the UE 115 may apply the spreading sequence to the data to be transmitted in the uplink transmission. The operations of 1720 may be performed according to the methods described herein. In certain examples, aspects of the operations of 1720 may be performed by a spreading component as described with reference to FIGS. 7 through 10.

At 1725 the UE 115 may channel code the data to be transmitted to generate channel coded data. The operations of 1725 may be performed according to the methods described herein. In certain examples, aspects of the operations of 1725 may be performed by a coding component as described with reference to FIGS. 7 through 10.

At 1730 the UE 115 may modulate the channel coded data to generate a series of modulation symbols. The operations of 1730 may be performed according to the methods described herein. In certain examples, aspects of the operations of 1730 may be performed by a modulation component as described with reference to FIGS. 7 through 10.

At 1735 the UE 115 may map the spreaded modulation symbols to resources, where the resources may include, but are not limited to, frequency resources, time resources, spatial resources, or any combination thereof. The operations of 1735 may be performed according to the methods described herein. In certain examples, aspects of the operations of 1735 may be performed by a resource mapping component as described with reference to FIGS. 7 through 10.

At 1740 the UE 115 may transmit the uplink transmission to the base station. The operations of 1740 may be performed according to the methods described herein. In certain examples, aspects of the operations of 1740 may be performed by a data transmission manager as described with reference to FIGS. 7 through 10.

Figure 18:
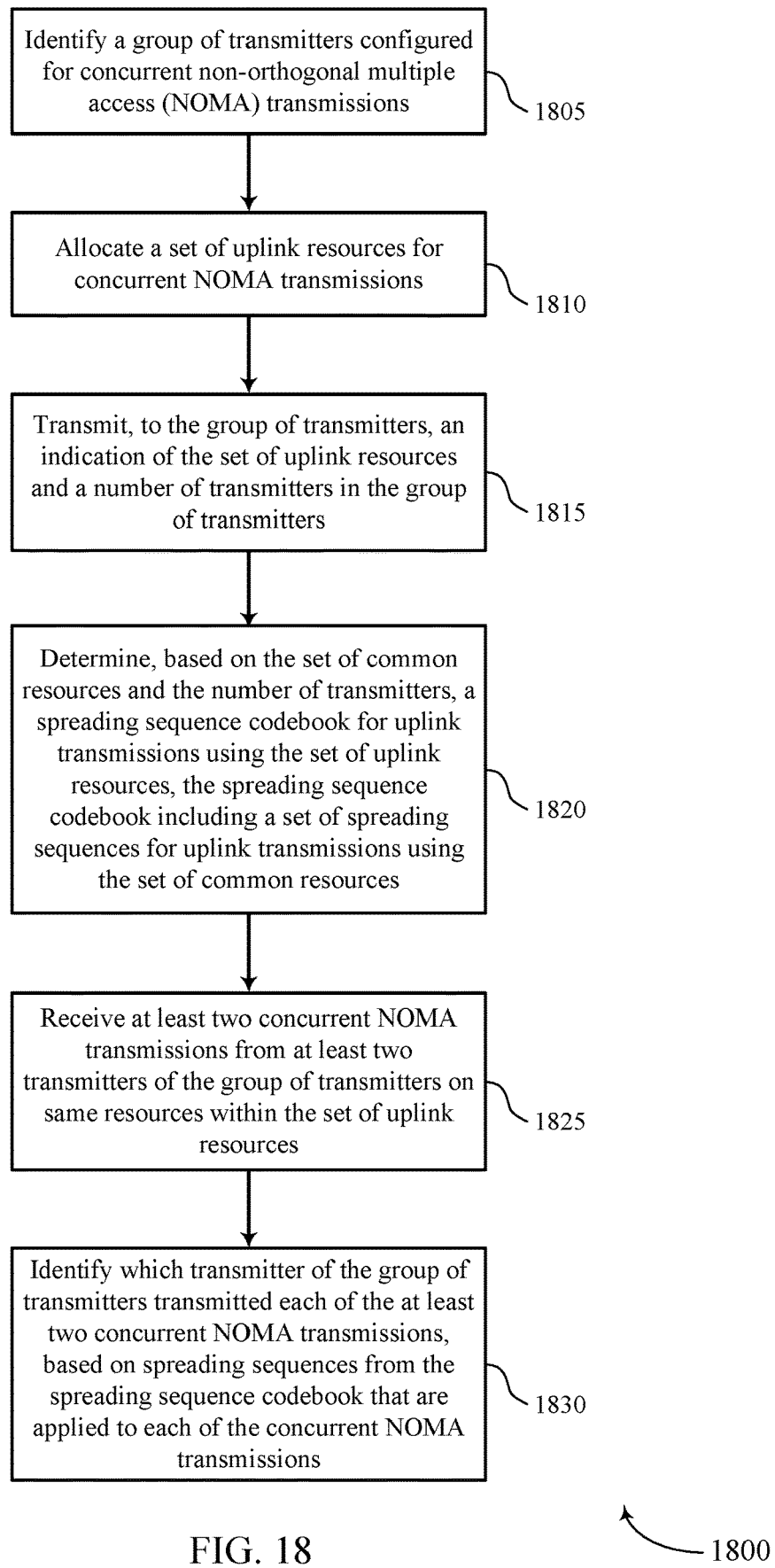

FIG. 18 shows a flowchart illustrating a method 1800 for signal spreading techniques for non-orthogonal multiple access wireless communications in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may identify a group of transmitters configured for concurrent NOMA transmissions. The operations of 1805 may be performed according to the methods described herein. In certain examples, aspects of the operations of 1805 may be performed by a NOMA manager as described with reference to FIGS. 11 through 14.

At 1810 the base station 105 may allocate a set of uplink resources for concurrent NOMA transmissions. The operations of 1810 may be performed according to the methods described herein. In certain examples, aspects of the operations of 1810 may be performed by a resource allocation component as described with reference to FIGS. 11 through 14.

At 1815 the base station 105 may transmit, to the group of transmitters, an indication of the set of uplink resources and a number of transmitters in the group of transmitters. The operations of 1815 may be performed according to the methods described herein. In certain examples, aspects of the operations of 1815 may be performed by a NOMA manager as described with reference to FIGS. 11 through 14.

At 1820 the base station 105 may determine, based on the set of common resources and the number of transmitters, a spreading sequence codebook for uplink transmissions using the set of uplink resources, the spreading sequence codebook including a number of spreading sequences for uplink transmissions using the set of common resources. The operations of 1820 may be performed according to the methods described herein. In certain examples, aspects of the operations of 1820 may be performed by a spreading sequence manager as described with reference to FIGS. 11 through 14.

At 1825 the base station 105 may receive at least two concurrent NOMA transmissions from at least two transmitters of the group of transmitters on same resources within the set of uplink resources. The operations of 1825 may be performed according to the methods described herein. In certain examples, aspects of the operations of 1825 may be performed by a reception manager as described with reference to FIGS. 11 through 14.

At 1830 the base station 105 may identify which transmitter of the group of transmitters transmitted each of the at least two concurrent NOMA transmissions, based on spreading sequences from the spreading sequence codebook that are applied to each of the concurrent NOMA transmissions. The operations of 1830 may be performed according to the methods described herein. In certain examples, aspects of the operations of 1830 may be performed by a transmitter identification component as described with reference to FIGS. 11 through 14.

Figure 19:
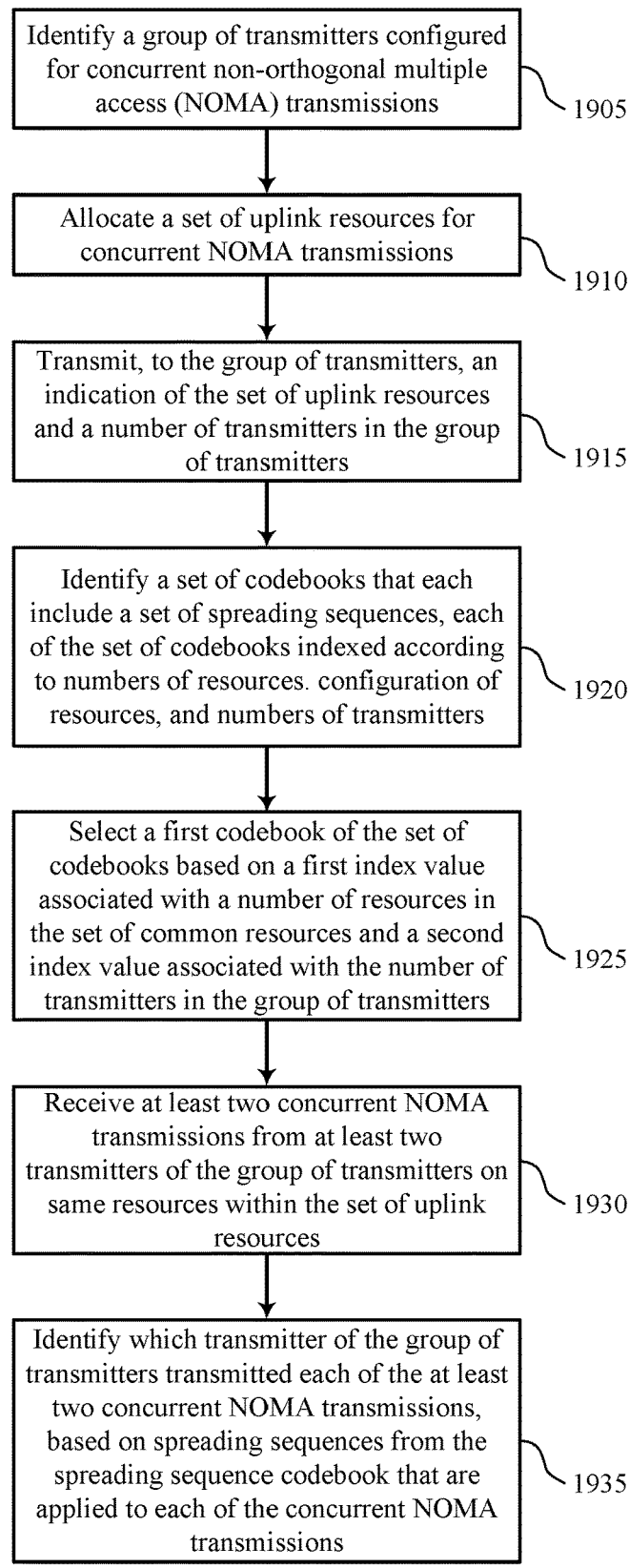

FIG. 19 shows a flowchart illustrating a method 1900 for signal spreading techniques for non-orthogonal multiple access wireless communications in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 1905 the base station 105 may identify a group of transmitters configured for concurrent NOMA transmissions. The operations of 1905 may be performed according to the methods described herein. In certain examples, aspects of the operations of 1905 may be performed by a NOMA manager as described with reference to FIGS. 11 through 14.

At 1910 the base station 105 may allocate a set of uplink resources for concurrent NOMA transmissions. The operations of 1910 may be performed according to the methods described herein. In certain examples, aspects of the operations of 1910 may be performed by a resource allocation component as described with reference to FIGS. 11 through 14.

At 1915 the base station 105 may transmit, to the group of transmitters, an indication of the set of uplink resources and a number of transmitters in the group of transmitters. The operations of 1915 may be performed according to the methods described herein. In certain examples, aspects of the operations of 1915 may be performed by a NOMA manager as described with reference to FIGS. 11 through 14.

At 1920 the base station 105 may identify a set of codebooks that each include a set of spreading sequences, each of the set of codebooks indexed according to numbers of resources, configuration of resources, and numbers of transmitters. The operations of 1920 may be performed according to the methods described herein. In certain examples, aspects of the operations of 1920 may be performed by a spreading sequence manager as described with reference to FIGS. 11 through 14.

At 1925 the base station 105 may select a first codebook of the number of codebooks based on a first index value associated with a number of resources in the set of common resources and a second index value associated with the number of transmitters in the group of transmitters. The operations of 1925 may be performed according to the methods described herein. In certain examples, aspects of the operations of 1925 may be performed by a spreading sequence manager as described with reference to FIGS. 11 through 14.

At 1930 the base station 105 may receive at least two concurrent NOMA transmissions from at least two transmitters of the group of transmitters on same resources within the set of uplink resources. The operations of 1930 may be performed according to the methods described herein. In certain examples, aspects of the operations of 1930 may be performed by a reception manager as described with reference to FIGS. 11 through 14.

At 1935 the base station 105 may identify which transmitter of the group of transmitters transmitted each of the at least two concurrent NOMA transmissions, based on spreading sequences from the spreading sequence codebook that are applied to each of the concurrent NOMA transmissions. The operations of 1935 may be performed according to the methods described herein. In certain examples, aspects of the operations of 1935 may be performed by a transmitter identification component as described with reference to FIGS. 11 through 14.

Figure 20:
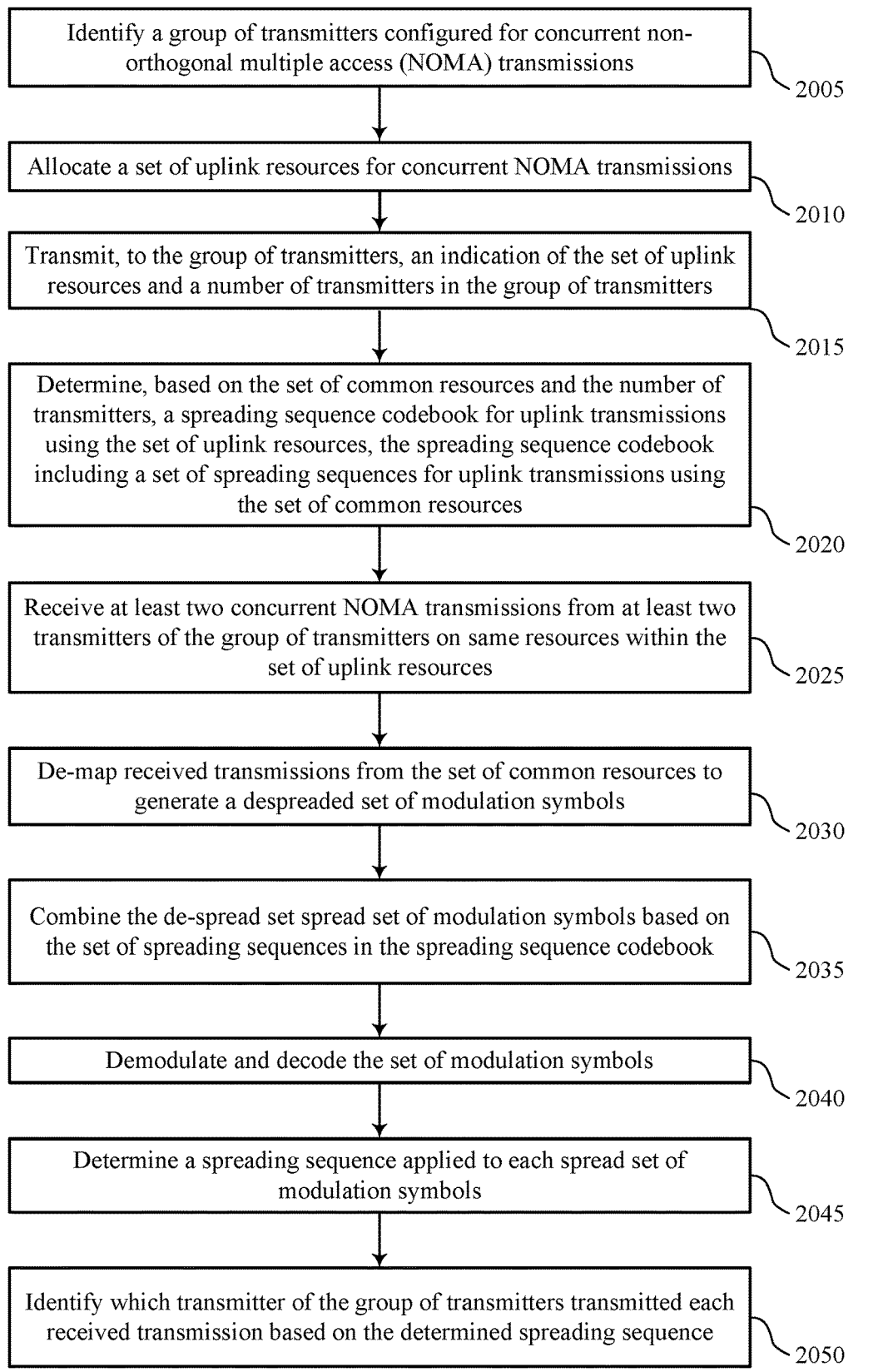

FIG. 20 shows a flowchart illustrating a method 2000 for signal spreading techniques for non-orthogonal multiple access wireless communications in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 2005 the base station 105 may identify a group of transmitters configured for concurrent NOMA transmissions. The operations of 2005 may be performed according to the methods described herein. In certain examples, aspects of the operations of 2005 may be performed by a NOMA manager as described with reference to FIGS. 11 through 14.

At 2010 the base station 105 may allocate a set of uplink resources for concurrent NOMA transmissions. The operations of 2010 may be performed according to the methods described herein. In certain examples, aspects of the operations of 2010 may be performed by a resource allocation component as described with reference to FIGS. 11 through 14.

At 2015 the base station 105 may transmit, to the group of transmitters, an indication of the set of uplink resources and a number of transmitters in the group of transmitters. The operations of 2015 may be performed according to the methods described herein. In certain examples, aspects of the operations of 2015 may be performed by a NOMA manager as described with reference to FIGS. 11 through 14.

At 2020 the base station 105 may determine, based on the set of common resources and the number of transmitters, a spreading sequence codebook for uplink transmissions using the set of uplink resources, the spreading sequence codebook including a number of spreading sequences for uplink transmissions using the set of common resources. The operations of 2020 may be performed according to the methods described herein. In certain examples, aspects of the operations of 2020 may be performed by a spreading sequence manager as described with reference to FIGS. 11 through 14.

At 2025 the base station 105 may receive at least two concurrent NOMA transmissions from at least two transmitters of the group of transmitters on same resources within the set of uplink resources. The operations of 2025 may be performed according to the methods described herein. In certain examples, aspects of the operations of 2025 may be performed by a reception manager as described with reference to FIGS. 11 through 14.

At 2030 the base station 105 may de-map received transmissions from the set of common resources to generate a de-spread set of modulation symbols. The operations of 2030 may be performed according to the methods described herein. In certain examples, aspects of the operations of 2030 may be performed by a de-mapping component as described with reference to FIGS. 11 through 14.

At 2035 the base station 105 may combine the de-spread set of modulation symbols based on the number of spreading sequences in the spreading sequence codebook. The operations of 2035 may be performed according to the methods described herein. In certain examples, aspects of the operations of 2035 may be performed by a de-spreading component as described with reference to FIGS. 11 through 14.

At 2040 the base station 105 may demodulate and decode the set of modulation symbols. The operations of 2040 may be performed according to the methods described herein. In certain examples, aspects of the operations of 2040 may be performed by a demodulation component as described with reference to FIGS. 11 through 14.

At 2045 the base station 105 may determine a spreading sequence applied to each spread set of modulation symbols. The operations of 2045 may be performed according to the methods described herein. In certain examples, aspects of the operations of 2045 may be performed by a transmitter identification component as described with reference to FIGS. 11 through 14.

At 2050 the base station 105 may identify which transmitter of the group of transmitters transmitted each received transmission based on the determined spreading sequence. The operations of 2050 may be performed according to the methods described herein. In certain examples, aspects of the operations of 2050 may be performed by a transmitter identification component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a base station, an indication of a set of common resources for an uplink transmission and a number of transmitters in a group of non-orthogonal multiple access (NOMA) transmitters configured for concurrent transmissions using the set of common resources;

determining, based at least in part on the set of common resources and the number of transmitters, a spreading sequence for the uplink transmission;

identifying data to be transmitted in the uplink transmission;

applying the spreading sequence to the data to be transmitted in the uplink transmission; and transmitting the uplink transmission to the base station.

2. The method of claim 1, wherein the spreading sequence is determined using a closed form expression in which each of a plurality of available spreading sequences can be determined based on a number and a configuration of resources in the set of common resources and an expected number of transmitters in the group of NOMA transmitters.

3. The method of claim 1, further comprising:
identifying a plurality of codebooks that each include a plurality of spreading sequences, each of the plurality of codebooks indexed according to numbers of resources and numbers of transmitters; and
selecting a first codebook of the plurality of codebooks based at least in part on a first index value associated with a number and a configuration of resources in the set of common resources and a second index value associated with the number of transmitters in the group of NOMA transmitters.

4. The method of claim 1, wherein the spreading sequence is a polyphase sequence that is a function of a number and a configuration of resources of the set of common resources and a selected transmitter of the number of transmitters in the group of NOMA transmitters.

5. The method of claim 4, wherein the selected transmitter is randomly selected or received from the base station.

6. The method of claim 1, wherein the set of common resources includes frequency resources, time resources, spatial resources, or any combination thereof.

7. The method of claim 1, further comprising:
channel coding the data to be transmitted to generate channel coded data; and
modulating the channel coded data to generate a series of modulation symbols.

8. The method of claim 7, wherein the spreading sequence is applied to each modulation symbol of the series of modulation symbols.

9. The method of claim 8, further comprising:
mapping the spread series of modulation symbols to resources of the set of common resources, wherein the resources include frequency resources, time resources, spatial resources, or any combination thereof.

10. The method of claim 1, wherein the set of common resources and the number of transmitters in the group of NOMA transmitters is received from the base station in a master information block (MIB), in a system information block (SIB), in remaining minimum system information (RMSI), in a group common PDCCH, or any combination thereof.

11. A method for wireless communication, comprising:
identifying a group of transmitters configured for concurrent non-orthogonal multiple access (NOMA) transmissions;
allocating a set of uplink resources for concurrent NOMA transmissions;
transmitting, to the group of transmitters, an indication of the set of uplink resources and a number of transmitters in the group of transmitters;
determining, based at least in part on the set of uplink resources and the number of transmitters, a spreading sequence codebook for uplink transmissions using the set of uplink resources, the spreading sequence codebook including a plurality of spreading sequences for uplink transmissions using the set of uplink resources;
receiving at least two concurrent NOMA transmissions from at least two transmitters of the group of transmitters on same resources within the set of uplink resources; and
identifying which transmitter of the group of transmitters transmitted each of the at least two concurrent NOMA transmissions, based at least in part on spreading sequences from the spreading sequence codebook that are applied to each of the concurrent NOMA transmissions.

12. The method of claim 11, wherein the plurality of spreading sequences are determined using a closed form expression in which each of the plurality of spreading sequences can be determined based on a number of resources in the set of uplink resources and the number of transmitters in the group of transmitters.

13. The method of claim 11, wherein the determining comprises:
identifying a plurality of codebooks that each include a plurality of spreading sequences, each of the plurality of codebooks indexed according to numbers of resources, configuration of resources, and numbers of transmitters; and
selecting a first codebook of the plurality of codebooks based at least in part on a first index value associated with a number of resources in the set of uplink resources and a second index value associated with the number of transmitters in the group of transmitters.

14. The method of claim 11, wherein the spreading sequences are polyphase sequences that are a function of a number of resources and a selected transmitter identity for transmitters of the group of transmitters.

15. The method of claim 11, wherein the set of uplink resources includes frequency resources, time resources, spatial resources, or any combination thereof.

16. The method of claim 11, wherein the receiving comprises:
de-mapping received transmissions from the set of uplink resources to generate a de-spread set of modulation symbols; and
combining the de-spread set of modulation symbols based at least in part on the plurality of spreading sequences in the spreading sequence codebook.

17. The method of claim 16, further comprising:
demodulating and decoding the de-spread set of modulation symbols.

18. The method of claim 17, further comprising:
determining a spreading sequence applied to each spread set of modulation symbols; and
identifying which transmitter of the group of transmitters transmitted each received transmission based at least in part on the determined spreading sequence.

19. The method of claim 11, wherein the set of uplink resources comprise a set of shared resources, and wherein the set of shared resources, a configuration and size of the spreading sequence codebook, and a spreading scheme is transmitted in a master information block (MIB), in a system information block (SIB), in remaining minimum system information (RMSI), in a payload of a group common physical downlink control channel (PDCCH) transmission, or any combination thereof.

20. An apparatus for wireless communication, comprising:
- a receiver configured to receive, from a base station, an indication of a set of common resources for an uplink transmission and a number of transmitters in a group of non-orthogonal multiple access (NOMA) transmitters configured for concurrent transmissions using the set of common resources;
- a processor;
- memory in electronic communication with the processor; and
- instructions stored in the memory and executable by the processor to cause the apparatus to:
- determine, based at least in part on the set of common resources and the number of transmitters, a spreading sequence for the uplink transmission;
- identify data to be transmitted in the uplink transmission; and
- apply the spreading sequence to the data to be transmitted in the uplink transmission; and
- a transmitter configured to transmit the uplink transmission to the base station.

21. The apparatus of claim 20, wherein the spreading sequence is determined using a closed form expression in which each of a plurality of available spreading sequences can be determined based on a number and a configuration of resources in the set of common resources and an expected number of transmitters in the group of NOMA transmitters.

22. The apparatus of claim 20, wherein the instructions to determine the spreading sequence are executable by the processor to cause the apparatus to:
- identify a plurality of codebooks that each include a plurality of spreading sequences, wherein each of the plurality of codebooks is indexed according to numbers of resources and numbers of transmitters; and
- select a first codebook of the plurality of codebooks based at least in part on a first index value associated with a number and a configuration of resources in the set of common resources and a second index value associated with the number of transmitters in the group of NOMA transmitters.

23. The apparatus of claim 20, wherein the instructions are further executable by the processor to cause the apparatus to:
- channel code the data to be transmitted to generate channel coded data; and
- modulate the channel coded data to generate a series of modulation symbols.

24. The apparatus of claim 23, wherein the spreading sequence is applied to each modulation symbol of the series of modulation symbols.

25. The apparatus of claim 24, wherein the instructions to apply the spreading sequence is executable by the processor to cause the apparatus to:
- map the spread series of modulation symbols to resources of the set of common resources, wherein the resources include frequency resources, time resources, spatial resources, or any combination thereof.

26. An apparatus for wireless communication, comprising:
- a processor;
- memory in electronic communication with the processor; and
- instructions stored in the memory and executable by the processor to cause the apparatus to:
- identify a group of transmitters configured for concurrent non-orthogonal multiple access (NOMA) transmissions; and
- allocate a set of uplink resources for concurrent NOMA transmissions;
- a transmitter configured to transmit, to the group of transmitters, an indication of the set of uplink resources and a number of transmitters in the group of transmitters;
- the instructions executable by the processor to cause the apparatus to determine, based at least in part on the set of uplink resources and the number of transmitters, a spreading sequence codebook for uplink transmissions using the set of uplink resources, the spreading sequence codebook including a plurality of spreading sequences for uplink transmissions using the set of uplink resources;
- a receiver configured to receive at least two concurrent NOMA transmissions from at least two transmitters of the group of transmitters on same resources within the set of uplink resources; and
- the instructions executable by the processor to cause the apparatus to identify which transmitter of the group of transmitters transmitted each of the at least two concurrent NOMA transmissions, based at least in part on spreading sequences from the spreading sequence codebook that are applied to each of the concurrent NOMA transmissions.

27. The apparatus of claim 26, wherein the plurality of spreading sequences are determined using a closed form expression in which each of the plurality of spreading sequences can be determined based on a number of resources in the set of uplink resources and the number of transmitters in the group of transmitters.

28. The apparatus of claim 26, wherein the instructions to determine the spreading sequence codebook are executable by the processor to cause the apparatus to:
- identify a plurality of codebooks that each include a plurality of spreading sequences, each of the plurality of codebooks indexed according to numbers of resources, configuration of resources, and numbers of transmitters; and
- select a first codebook of the plurality of codebooks based at least in part on a first index value associated with a number of resources in the set of uplink resources and a second index value associated with the number of transmitters in the group of transmitters.

29. The apparatus of claim 26, wherein the instructions are further executable by the processor to cause the apparatus to:
- de-map received transmissions from the set of uplink resources to generate a de-spread set of modulation symbols; and
- combine the de-spread set of modulation symbols based at least in part on the plurality of spreading sequences in the spreading sequence codebook.

30. The apparatus of claim 29, wherein the instructions are further executable by the processor to cause the apparatus to:
- demodulate and decode the de-spread set of modulation symbols.

* * * * *